(12) United States Patent
Nickerson

(10) Patent No.: US 11,728,762 B2
(45) Date of Patent: Aug. 15, 2023

(54) PORTABLE SYSTEM FOR MOUNTING A SOLAR PANEL

(71) Applicant: Portable Solar Inc., Pinecrest, FL (US)

(72) Inventor: Dennis Nickerson, Pinecrest, FL (US)

(73) Assignee: Portable Solar Inc., Pinecrest, FL (US)

( * ) Notice: Subject to any disclaimer, the term of this patent is extended or adjusted under 35 U.S.C. 154(b) by 0 days.

(21) Appl. No.: 17/729,362

(22) Filed: Apr. 26, 2022

(65) Prior Publication Data

US 2022/0345076 A1  Oct. 27, 2022

Related U.S. Application Data

(60) Provisional application No. 63/180,638, filed on Apr. 27, 2021.

(51) Int. Cl.
  *H02S 40/34* (2014.01)
  *H02S 20/30* (2014.01)

(52) U.S. Cl.
  CPC ............ *H02S 20/30* (2014.12); *H02S 40/34* (2014.12)

(58) Field of Classification Search
  None
  See application file for complete search history.

(56) References Cited

U.S. PATENT DOCUMENTS

| 2010/0147359 A1 | 6/2010 | Harberts et al. |
| 2012/0199180 A1 | 8/2012 | Salam |
| 2016/0173022 A1 | 6/2016 | Hirose et al. |
| 2016/0329859 A1 | 11/2016 | Cap et al. |

FOREIGN PATENT DOCUMENTS

DE  102009019548 A1  11/2010

OTHER PUBLICATIONS

International Search Report and Written Opinion for International Patent Application No. PCT/US2022/026301; dated Jul. 28, 2022; 15 pages.
Notification of the International Application Number and of the International Filing Date for International Patent Application No. PCT/US2022/026301; dated May 9, 2022; 1 page.

*Primary Examiner* — Dustin Q Dam
(74) *Attorney, Agent, or Firm* — Run8 Patent Group, LLC; Peter Miller

(57) ABSTRACT

A portable system for mounting a solar panel includes a modular base defining a set of interconnecting components that assemble via a set of intra-assembly features into a portable base for a solar panel. The modular base includes lower and upper relief to provide passive ventilation to the interior of the modular base and recesses to accommodate a user's appendages during assembly, and ballast volumes to retain a non-rigid ballast to weight the module base holding it in place. The modular base includes adjustable panel retention structures to constrain solar panels of a range of dimensions and configured to carry moisture away from the solar panel. The modular base includes a set of latches and corresponding latch receivers to fix adjacent modular bases together at a fixed distance less than the width of a human hand to form an array.

15 Claims, 13 Drawing Sheets

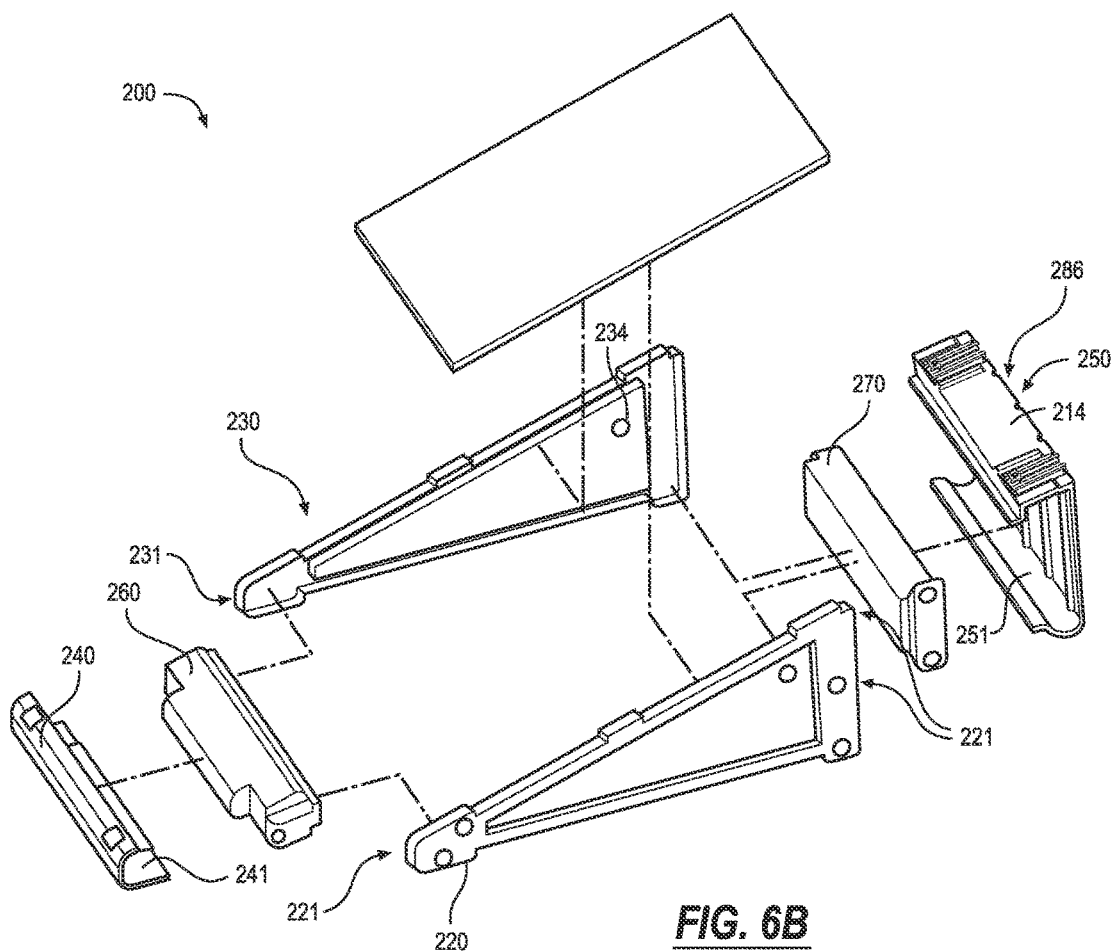
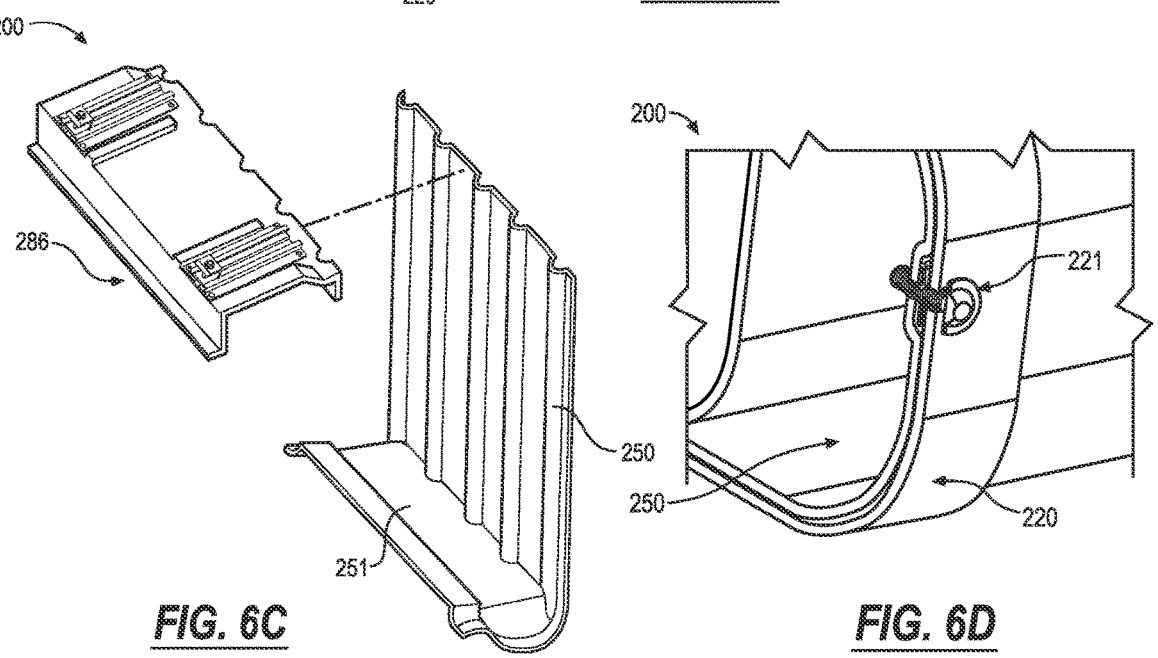
FIG. 6B
FIG. 6C
FIG. 6D

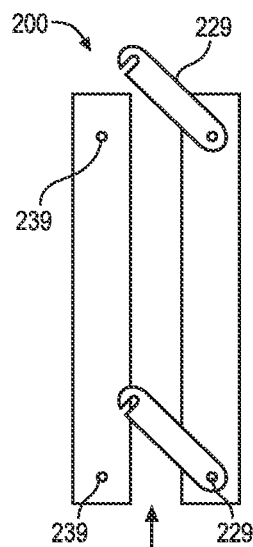
FIG. 8A — REAR (DISENGAGED)
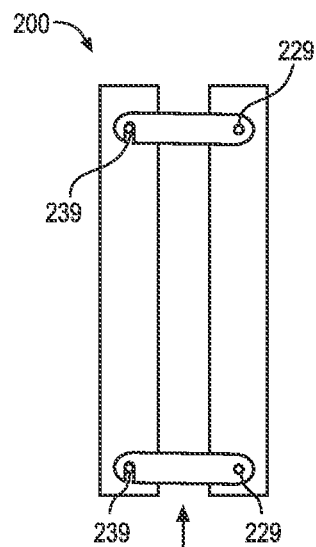
FIG. 8B — REAR (ENGAGED)
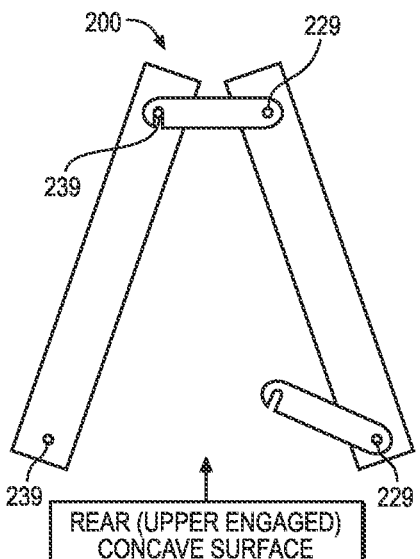
FIG. 8C — REAR (UPPER ENGAGED) CONCAVE SURFACE
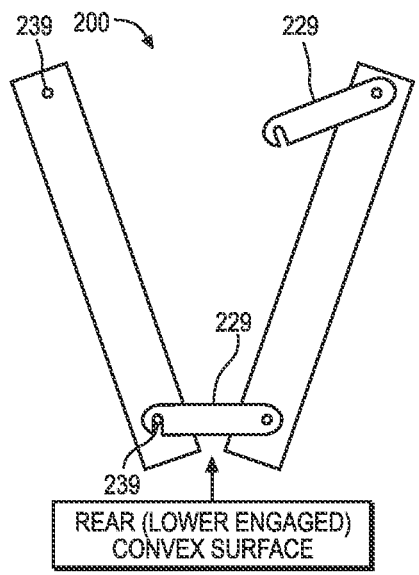
FIG. 8D — REAR (LOWER ENGAGED) CONVEX SURFACE
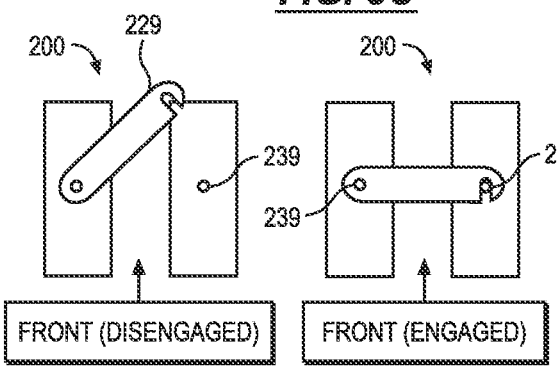
FIG. 8E — FRONT (DISENGAGED)
FIG. 8F — FRONT (ENGAGED)
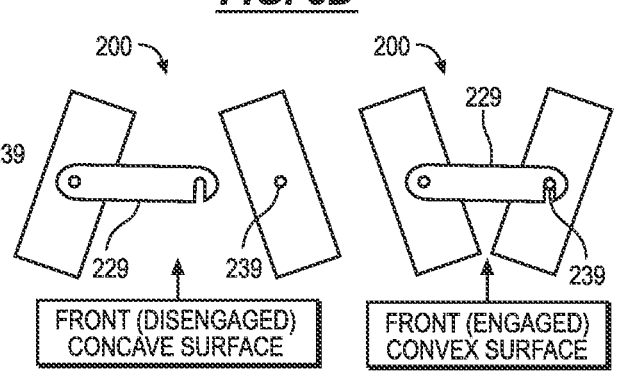
FIG. 8G — FRONT (DISENGAGED) CONCAVE SURFACE
FIG. 8H — FRONT (ENGAGED) CONVEX SURFACE

PORTABLE SYSTEM FOR MOUNTING A SOLAR PANEL

CROSS-REFERENCE TO RELATED APPLICATIONS

This Application claims priority to U.S. Provisional Application No. 63/180,638, filed on 27 Apr. 2021, which is incorporated in its entirety by this reference.

GOVERNMENT LICENSE RIGHTS

This was made with government support under Grant No. 2014698 awarded by the National Science Foundation and Grant No. 2020-3755 awarded by the California Clean Energy Fund, dba, CalCEF Ventures. The government may have certain rights in the invention.

TECHNICAL FIELD

This invention relates generally to the field of solar energy and more specifically to a new and useful system for mounting a solar panel at ground-level and on flat or low-sloped roofs in a portable manner.

BRIEF DESCRIPTION OF THE FIGURES

FIGS. 6B-6D are schematic representations of one variation of the second system;

FIGS. 8A, 8B, 8C, 8D, 8E, 8F, 8G, and 8H are schematic representations of one variation of the second system;

DESCRIPTION OF THE EMBODIMENTS

Figure 1A:
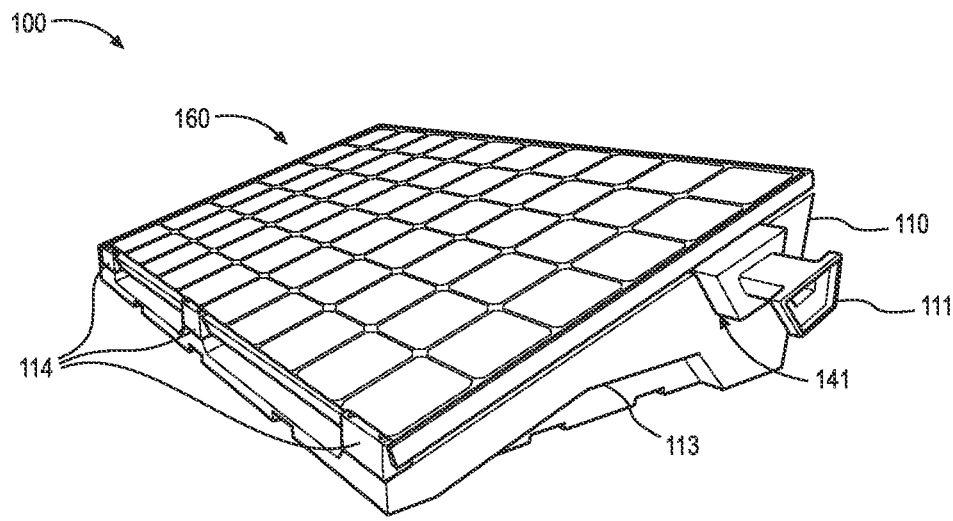
FIGS. 1A, 1B, 1C, and 1D are schematic representations of a first system.
Figure 1B:
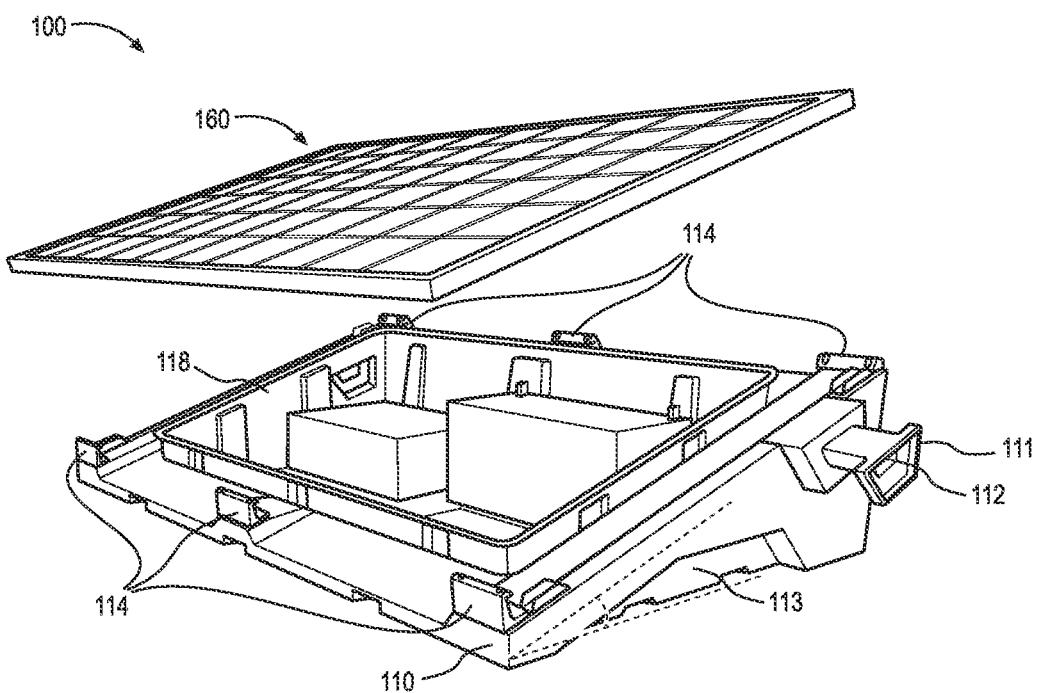
Figure 1C:
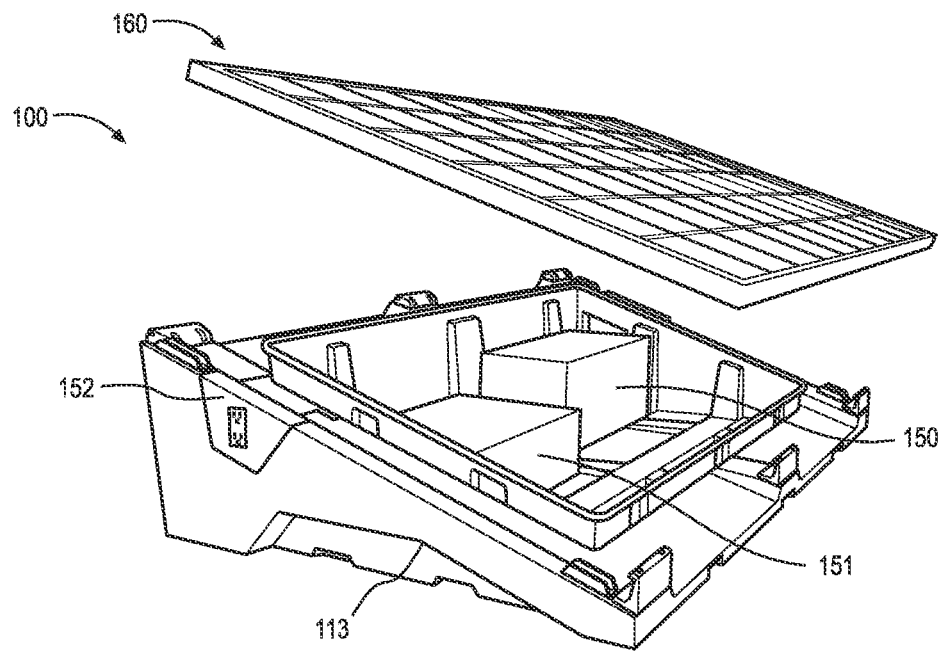
Figure 1D:
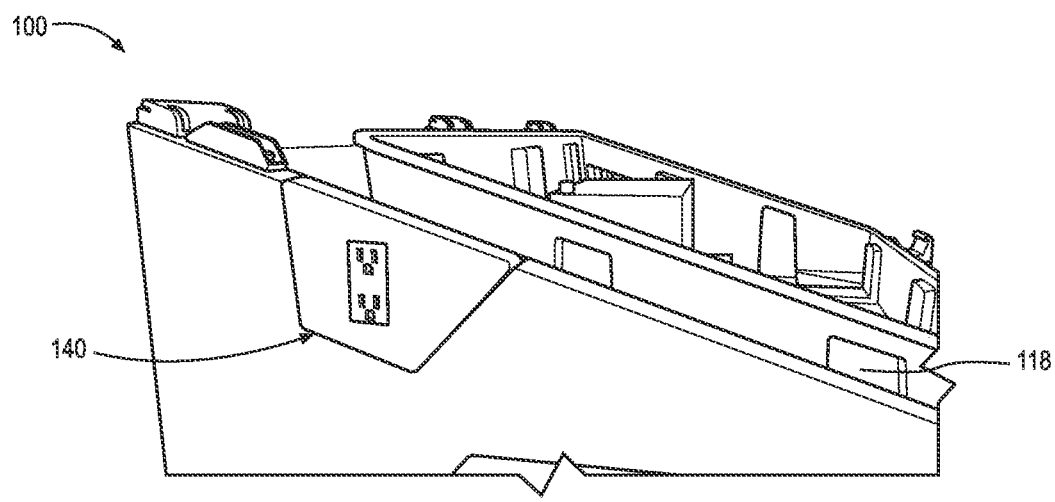

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First System

A first system 100 for securing and locating a solar panel 160 for harvesting energy from incident sunlight includes: a chassis 110; and a connector module in.

The chassis 110 includes: a body defining a base 113, a perimeter wall 115 extending upward a distance from the base 113, a weighting cavity within the perimeter wall 115, a solar panel receptacle arranged over the perimeter wall 115 and forming an acute angle with the base 113, and a storage chamber 117 bounded by the perimeter wall 115 and inset from the solar panel receptacle; a set of securing mechanisms 114 arranged along the perimeter wall 115 and configured to transiently secure the solar panel 160 to the solar panel receptacle and over the storage chamber 117; a set of fill ports configured for filling the weighting cavity with weighted material to secure the body on a surface, the set of fill ports arranged within the storage chamber 117 and passing through the perimeter wall 115; and a set of docks inset in the perimeter wall 115 on opposing lateral sides of the body and configured to receive the connector module 111 to connect the body to adjacent chassis 110.

The connector module 111 is: configured to insert into adjacent docks 140, 141 in a pair of abutting units of the chassis 110; configured to mechanically connect the pair of abutting units of the chassis 110 to form a linear array of chassis 110; configured to pass electrical wiring between the pair of abutting units of the chassis 110 via a channel 112; and retained in docks in the pair of abutting units of the chassis 110 by solar panels installed in solar panel receptacles of the pair of abutting units of the chassis 110. (More specifically, the connector module 111 is: configured to insert into adjacent docks in a pair of abutting units of the chassis 110; configured to mechanically connect the pair of abutting units of the chassis 110 to form a linear array of chassis 110; configured to pass electrical wiring between the pair of abutting units of the chassis 110; and retained in docks in the pair of abutting units of the chassis 110 by solar panels installed in solar panel receptacles of the pair of abutting units of the chassis 110.)

In one variation, the first system 100 further includes a direct-power module 150: configured to install in a dock 118 in the chassis 110; retained by a solar panel 160 installed in the solar panel receptacle; configured to electrically couple to the solar panel 160 (e.g., via a separate power conditioning module 151 or a power conditioning module integrated into the direct-power module); and defining an electrical receptacle 152 configured to receive an electrical plug and to supply electrical power from the solar panel 160 to an electronic device via the electrical plug.

In another variation, the first system 100 further includes a utility module: configured to install in a dock in the chassis 110; retained by a solar panel 160 installed in the solar panel receptacle; configured to electrically couple to a power inverter 153 arranged in the storage chamber 117 and coupled to the solar panel 160 (or to an array of solar panels 160 installed in a row of connected units of the chassis 110); and defining an electrical receptacle or an electrical cable configured to connect to an electrical panel or electrical meter at a building to supply energy captured by the solar panel(s) to the building.

In another variation, the first system 100 can include: a first wall segment 130 of a first height; a second wall segment 131 of a second height lesser than the first height; a set of securing mechanisms 114 arranged along each wall segment and configured to transiently secure a solar panel 160 to the first wall segment 130 and the second wall segment 131; a set of fill ports configured for filling each wall segment with weighted material to secure the body on a surface; and a set of docks inset in the first wall segment 130 on opposing lateral sides of the first wall segment 130 and configured to receive the connector module 111 to connect the system to an adjacent system. In this variation, the first wall segment 130 can be secured at varying locations along a length of the solar panel 160, thereby adjusting the angle of the solar panel 160 relative to the surface.

1.1 Applications

Generally, the first system 100 forms a solar panel mount configured: to receive and secure a solar panel; to locate the solar panel at a particular location, such as on a ground area or on a flat or low-sloped roof; and to orient the solar panel at a particular (fixed) angle at which the solar panel harvests energy from incident sunlight. For example, the first system 100 can be configured for deployment: with a single chassis supporting a single solar panel; or as a set of chassis supporting a set of solar panels and connected via connector modules to form a linear solar panel array. Similarly, the first system 100 can be configured for: temporary deployment on a ground area (e.g., adjacent a garden to power gardening tools or on a pool deck to power a pool heater during summer and fall seasons); mobile deployment on a ground area (e.g., to power electric cattle fencing as a herd is moved between pastures); permanent deployment on a ground area (e.g., to power a groundwater well year-round); semi-permanent deployment on a roof (e.g., to augment grid power for a tenant occupying a rented single- or multi-family home); or permanent deployment on a roof (e.g., to augment grid power for a homeowner). Solar panel systems enable a property owner and/or tenant to reduce their electricity bills, invest in renewable energy sources, reduce their dependence on fossil fuels, combat greenhouse gas emissions, increase the value of their property, or some combination thereof.

In particular, the first system 100 can enable an owner (e.g., property owner, a tenant) to assemble and install a solar panel (or an array of solar panels) on a property without requiring: elaborate or labor-intensive structural alterations to the property (e.g., a roof); skilled or specialized labor for assembly and installation (thereby reducing upfront installation costs and maintenance costs over time); permanent installation in a fixed or singular location (e.g., on a roof); a permanent solar panel configuration (e.g., a number and arrangement of solar panels); or installation on a roof of a particular type (e.g., a roof of slope greater than 1:12). Rather, the first system 100 defines a portable solar panel mounting solution: containing a limited number of parts; requiring minimal tools to assemble; configured to deploy with one solar panel on one chassis or with many solar panels on many interconnected units of the chassis; and configured for temporary, mobile, or permanent installation on the ground, on a flat roof, or on a sloped roof.

1.1.1 Grid-Isolated Installation

Furthermore, the first system 100 includes a hollow, lightweight chassis of a size and weight that enables direct shipping to the owner's property. For example, upon receipt, the owner may assemble a complete solar installation by: abutting units of the chassis at or near a preferred solar energy capture location (e.g., in a grassy area near a garden, on a flat roof, along a pool deck); inserting connector modules in adjacent first and second docks of abutting chassis; positioning power electronics (e.g., for 12VDC, 120VAC, and/or 240VAC outputs) for these solar panels in the storage chamber in one or more of these chassis; inserting a first direct-power module (e.g., with 12VDC and 120VAC outputs) into the first dock of a first chassis at a first end of the set of connected chassis; inserting a second direct-power module (e.g., with a 240VAC output) into the second dock of a second chassis at a second end of the set of connected chassis; filling weighting cavities in these chassis—accessed from within their storage chambers via the fill ports—with water, sand, or other weighted material; connecting these solar panels to the power electronics and direct-power modules by routing electrical wiring through the connector modules; and installing and locking solar panels to each solar panel receptacle (e.g., with the only requisite tool to lock the securing mechanisms on the solar panels). The owner may then immediately use the solar panel assembly by: connecting DC electronic devices (e.g., a backup battery storage module or electric vehicle charging station) to the first direct-power-module; connecting 120VAC electronic devices (e.g., an electric weed whacker, an outdoor heater, construction tools) to the first direct-power-module; or connecting 240VAC electronic devices (e.g., a washing machine, a pool heater) to the second direct-power-module.

Therefore, the owner may deploy and immediately operate the first system 100 and a set of a solar panels with as little as a single tool, with minimal or no specialized skills, and without permanently installing the first system 100 or modifying her property.

Additionally, the first system 100 can be shipped in packaging that can be repurposed as a reusable cover, for example, that an owner may use to protect their solar panel first system 100 (e.g., when covering and/or removing and storing their solar panel first system 100 during potential severe weather conditions and/or while away on vacation).

1.1.2 Grid-Connected Installation

In a similar example, to connect the first system 100 to the electrical grid and/or an electrical panel in her home, the owner may exchange the second direct-power module for a utility module. An electrician may then wire the utility module to the electrical panel or electrical meter at the owner's home to complete the installation. Furthermore, while waiting for the electrician to complete this wiring installation, the owner may continue to use the first system 100 by connecting electronic devices to the first direct-power module.

1.1.3 Moving and Disassembly

At a later time, the owner may move the first system 100 to a new location. The owner may: remove the solar panels from the solar panel receptacles; empty the weighting cavities; and move these lightened chassis to a new location (e.g., at the same or different property), orientation (e.g., to better track the Sun), or distribution (e.g., one 6-chassis assemble in one location to two 3-chassis assemblies in two different locations) before reweighting the chassis and reinstalling the solar panels.

1.1.4 Security

In addition, the first system 100 is formed in a unitary, compact manner in which several security features are inherently built into the structure. In particular, the first system 100 transiently secures a solar panel to the solar panel receptacle atop the first system 100 with a set of securing mechanisms and covers the storage chamber within the chassis of the first system 100, such that only an authorized person with a key to the set of securing mechanisms can remove the solar panel from the first system 100 and access the storage chamber. Within the storage chamber, the first system 100 can house a set of electrical components and wiring (e.g., a set of inverters and/or batteries). In addition, a set of fill ports and drains can be arranged within the storage chamber for filling and draining the weighting cavity of the first system 100 with weighted material (e.g., water, sand). Accordingly, once filled with weighted material, the first system 100 is weighted down against a surface such that it may be difficult for a person to carry and/or move the first system 100 (even though the first system 100 may not be mounted or connected to a permanent structure). Further, the weighting cavity can only be emptied by accessing the set of drains within the storage cavity (e.g., by an authorized person with the key to remove the solar panel from the first system 100). Therefore, the first system 100 can be moved only after the solar panel is removed and the weighted material is drained from the weighting cavity, thereby reducing the likelihood of tampering or theft of the first system 100 and protecting electronics housed within the first system 100.

1.1.5 System Care and Maintenance

Moreover, the first system 100 can be installed at ground-level, which enables an owner to care for the solar panel first system 100 themselves and perform most self-maintenance, such as washing the solar panels, repositioning and/or reorienting the first system 100, and removing and storing the solar panel if needed (e.g., due to severe weather conditions or during travel), thereby minimizing the need to hire skilled labor to complex maintenance or repairs of the solar panel first system 100. Further, due to the portable and streamlined structure of the first system 100, rental tenants can invest in solar energy without the complications of altering a rental property and can retain their investment as they move and relocate to different properties throughout different phases of life.

Accordingly, the first system 100 can: significantly reduce both installation costs and time to useful operation of a solar panel first system 100; form a secure, self-contained solar energy unit that inhibits theft and tampering; and support modular deployment of a solar energy solution within one property and across multiple properties over time for both property owners and tenants.

1.2 Structure

In one example implementation, the first system 100 can include a chassis formed of a unitary structure that defines the main body of the first system 100. The chassis body defines: a base; a hollow perimeter wall extending upward from the base, wherein top edges of lateral sides of the perimeter wall are angled relative to the base (e.g., at a 10-degree or 18-degree slope, or at a slope there-between); a weighting cavity within the perimeter wall; a solar panel receptacle arranged over the perimeter wall and forming an acute angle with the base (i.e., a solar angle of the first system 100 at which the solar panel is oriented when mounted to the chassis); and a storage chamber bounded by the perimeter wall and inset from the solar panel receptacle. In one example, the chassis can include a set of handles for lifting, moving, and/or positioning the first system 100 (e.g., during installation and/or relocation of the first system 100). The chassis can further include a set of airflow channels to improve the flow of air within the storage chamber of the first system 100.

The first system 100 can further include a set of securing mechanisms arranged along a top portion of the perimeter wall of the chassis, each securing mechanism configured to transiently secure a solar panel to the solar panel receptacle atop the chassis and over the storage chamber. One or more of the securing mechanisms can include a keyed lock such that only an owner with a key can open the securing mechanisms and release the solar panel from the chassis. In one example shown in FIGS. 1A-1D, the first system 100 includes 6 securing mechanisms, with four securing mechanisms arranged at each corner of the solar panel and two securing mechanisms arranged at the centers of the longitudinal edges of the solar panel.

In one example, the chassis can include a set of fill ports configured for filling the weighting cavity (i.e., of the perimeter wall) with weighted material (e.g., water, sand) to secure the first system 100 on a surface and minimize movement of the first system 100 (e.g., due to wind and other environmental conditions, tampering, theft, etc.). The set of fill ports can be arranged on an internal face of the chassis such that the fill ports can only be accessed if the solar panel is removed from the first system 100 (i.e., the weight inside the chassis can only be emptied by authorized persons), thereby minimizing the risk of tampering or theft of the solar panel first system 100 due to the significant weight of the first system 100. In one example, the chassis can include a set of fill level indicators that each indicate a different fill level to which the weighting cavity of the chassis can be loaded with weight (e.g., a recommended minimum fill level, maximum fill level, and fill levels in between). For example, an owner who lives in an area with high winds may choose to fill the chassis to a maximum fill level to prevent high winds from moving and/or overturning the first system 100 and causing damage to the solar panel. In addition, the chassis can include a drain to remove the weighted material inside the weighting cavity of the chassis in the event that an owner wants to reposition and/or relocate the first system 100. The drain can be arranged on an internal face of the chassis such that the drain can only be accessed by removing the solar panel atop the chassis (i.e., by an owner with the key).

In one example, the chassis can further include a set of holes into which a set of mounting stakes can be driven to secure the first system 100 to the ground. In addition, the chassis can include a set of ridges and/or channels along the perimeter wall of the chassis to enable water runoff and prevent water collection on the first system 100 and potential water damage to any electronics of the first system 100. Additionally and/or alternatively, the chassis can include a set of airflow channels to improve the flow of air within the storage chamber of the first system 100 (e.g., to prevent overheating of any electronics located within the storage chamber).

The first lateral side of the perimeter wall defines a first dock and the second lateral side of the perimeter wall defines a second dock, wherein the first dock and the second dock are configured to receive a connector module (for electrically connecting adjacent systems 100, for example, in an array of solar panels), a utility module (for electrically connecting the first system 100 to a utility meter), or a direct-power module (for powering a set of devices electrically connected to the first system 100). In one example shown in FIGS. 1B and 1C, the first dock and the second dock define similar geometries: arranged on the lateral sections of the perimeter wall of the body; and symmetric (e.g., "mirrored") across the sagittal plane of the body. Each of the first and second docks can also: be symmetric across a plane parallel to the coronal plane of the body; and form an upward-facing (e.g., a "U-shaped") relief along its corresponding segment of the perimeter wall.

Generally, the connector module can electrically connect the first system 100 to adjacent systems 100 in an array of solar panel systems 100. In one example, the connector module can include: a body that nests within a dock of a first unit of the chassis; and a mating protrusion that extends from the body of the connector module and is configured to interlock with a dock of a second, adjacent unit of the chassis of an array of solar panel systems 100. The connector module can further include a channel extending from a first end to a second end of the connector module for passing electrical wires from the first unit of the chassis to the second, adjacent unit of the chassis, thereby forming a secure connection between adjacent solar panel systems 100 in which electrical wiring is concealed from the elements of the environment and possible tampering. Therefore, when first and second units of the chassis are abutted with a dock of the first unit facing a dock of the second unit, a connector module may be inserted into and may span the dock of the first unit and the dock of the second unit, thereby mechanically coupling the first unit of the chassis to the second unit of the chassis. Electrical wiring may then be passed between the first and second units of the chassis via the connector module. A first solar panel installed and locked in a first solar panel receptacle of the first unit of the chassis can retain the connector module in the dock of the first unit of the chassis, and a second solar panel installed and locked in a second solar panel receptacle of the second unit of the chassis can similarly retain the connector module in the dock of the second unit of the chassis. Therefore, assembly of the connector module between the first and second units of the chassis and installation of solar panels on the first and second chassis units can: require minimal tools (e.g., only a tool to lock securing mechanisms on the chassis to the solar panels); secure electrical components within the storage chambers in these chassis; mechanically lock and retain the chassis in a linear array; and manage electrical cable routing between solar panels.

Generally, the utility module can electrically connect the first system 100 to a utility meter located on the property of the owner. In one example, the utility module can include: a body that nests within a dock of a first system 100; an internal face that is exposed within the storage chamber of the chassis; and an external face that is exposed outside of the chassis to the external environment. The internal face of the utility module can include an outlet for connecting a set of cables from the solar panel and/or a set of batteries housed within the first system 100, and the external face can include an outlet for connecting a cable from the first system 100 to the utility meter. In an alternate implementation, the utility module can include a window for passing a set of electrical wires/cables from the first system 100 directly to an external inverter and/or a utility meter of the property.

Generally, the direct-power module can include a set of electrical connections for the owner to temporarily power a desired device via the first system 100 and can be placed in a dock on an end of a first system 100 that is not connected to an adjacent first system 100 or a utility meter, thereby concealing the internal area of the first system 100 from the external environment and maintaining the security of the first system 100. In one example, the direct-power module can include: a body that nests within a dock of a first system 100; an internal face that is exposed within the storage chamber of the chassis; and an external face that is exposed outside of the chassis to the external environment. The internal face can electrically connect directly to the solar panel and/or a battery within the first system 100. The external face can include a set of power sockets with different plug types and voltages (e.g., type A or type C or 120v or 240v, based on an owner's electrical needs), one or more USB ports, or some combination thereof, such that an owner can connect a desired device to the first system 100 and power the device with the electricity produced and/or converted by the solar panel.

In one example, the first system 100 can include: a set of inverters arranged in the storage chamber; and configured to convert a DC power signal output from the solar panel into a conditioned power signal (e.g., a 120-Volt single-phase AC signal, and 12-Volt DC signal) matched to an energy sink connected to the first system 100 (e.g., via the utility module). Additionally and/or alternatively, the first system 100 can include a set of batteries for storing AC electricity for later usage. In this example, the first system 100 can include an insertable tray that can be nested within the perimeter wall of the chassis and serve as a base enclosure for the storage chamber in which the set of inverters and/or the set of batteries can be securely stored within the first system 100 and remain sheltered from environmental conditions and/or unwanted tampering. In one example, the insertable tray is offset (e.g., by 1 inch or more) from the chassis to create a channel for airflow for the electronics housed within the first system 100 (i.e., to minimize overheating of the electronics).

Accordingly, the first system 100 can secure the solar panel atop the chassis and orient the solar panel at an angle relative to the base of the chassis, thereby forming a secure, self-contained first system 100 that enables the solar panel to harvest energy from incident sunlight.

1.3 Manufacturing Via Rotational Molding

Given the unitary structure of the first system 100, the first system 100 can be manufactured via a rotational molding (i.e., rotomolding) process using thermoplastic materials (e.g., polyethylene polymers). Rotational molding involves: creating a hollow mold in a shape of a particular structure; filling the mold with a determined amount of thermoplastic material; heating the mold to a particular temperature to soften the thermoplastic material within the mold; and rotating the mold about a set of axes, thereby causing the heated material to disperse and adhere to the perimeter wall of the mold. In one example, the mold can include a set of features built into the structure of the mold, such as inserts (e.g., for metal threads, fasteners, internal channels and structures, and other features), text, and/or logos. By manufacturing the first system 100 via rotational molding, the first system 100 is formed with a uniform wall thickness throughout the produced part, a hollow weighting cavity within the perimeter wall, and a minimal need for post-processing (final finishes and touches to the produced part), thereby reducing manufacturing costs and increasing potential savings for an owner.

In one implementation, the first system 100 can be manufactured via the rotational molding process using food grade plastic (e.g., plastic suitable for contact with consumable food or drink products) such that potable drinking water can be stored within the weighting cavity.

1.4 Modularity

In one implementation, the chassis can be formed of a set of smaller parts that, when assembled, form the body of the first system 100. For example, the chassis can include: a set of wall segments configured to be manually assembled, each wall segment including a mating end that interfaces with a reciprocal mating end of an adjacent wall segment and a set of securing mechanisms arranged along the mating ends to secure adjacent wall segments together. In one example, the mating end can include an interlocking mechanism such that a portion of each wall segment fits into a reciprocal portion of an adjacent wall segment. In this implementation, each wall segment can include its own fill port, cap, and drain for filling and draining the respective weighting cavity of the wall segment.

Figure 3A:
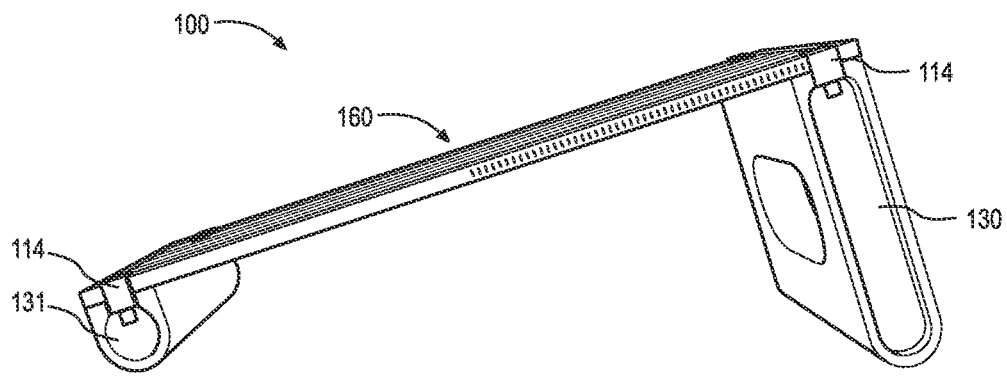
FIGS. 3A, 3B, 3C, 3D, and 3E are schematic representations of one variation of the first system.
Figure 3B:
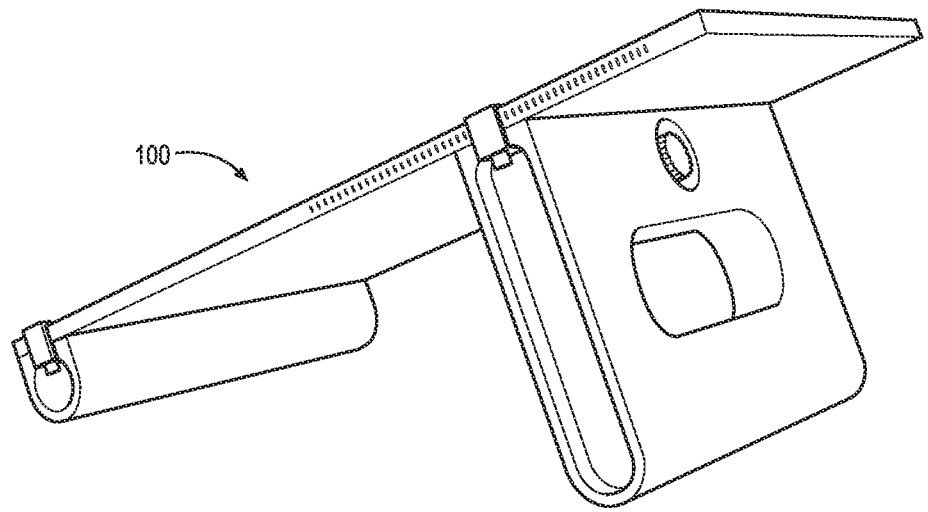
Figure 3C:
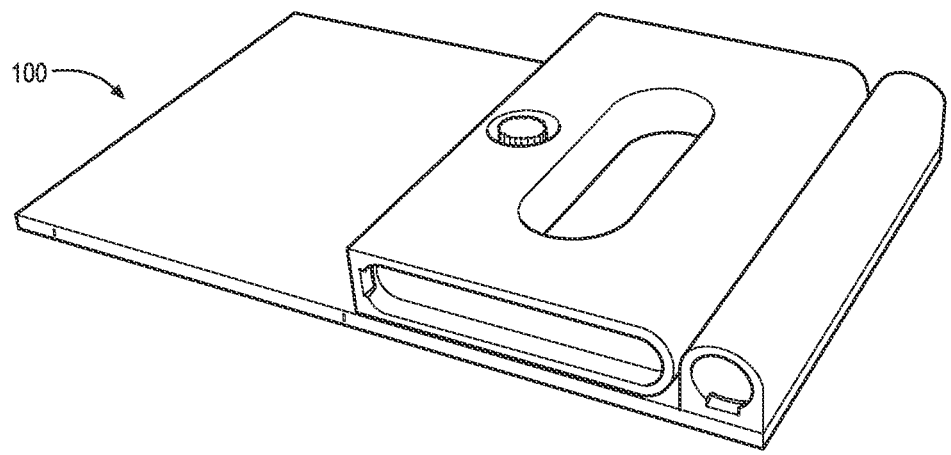

In another implementation illustrated in FIGS. 3A-3E, the chassis can include a first wall segment and a second wall segment configured to transiently secure to opposing ends of the solar panel. In this implementation, each wall segment can include its own fill port, cap, and drain for filling and draining the respective weighting cavity of the wall segment. As illustrated in FIG. 3C, each wall segment can be disassembled from the solar panel and arranged in a compact manner.

By modularizing the chassis, the first system 100 can be packaged for shipping to an owner in an unassembled state, thereby compacting the volume of the shipping package and reducing the shipping footprint and associated costs for the owner.

1.5 Alternate Orientations

Figure 2A:
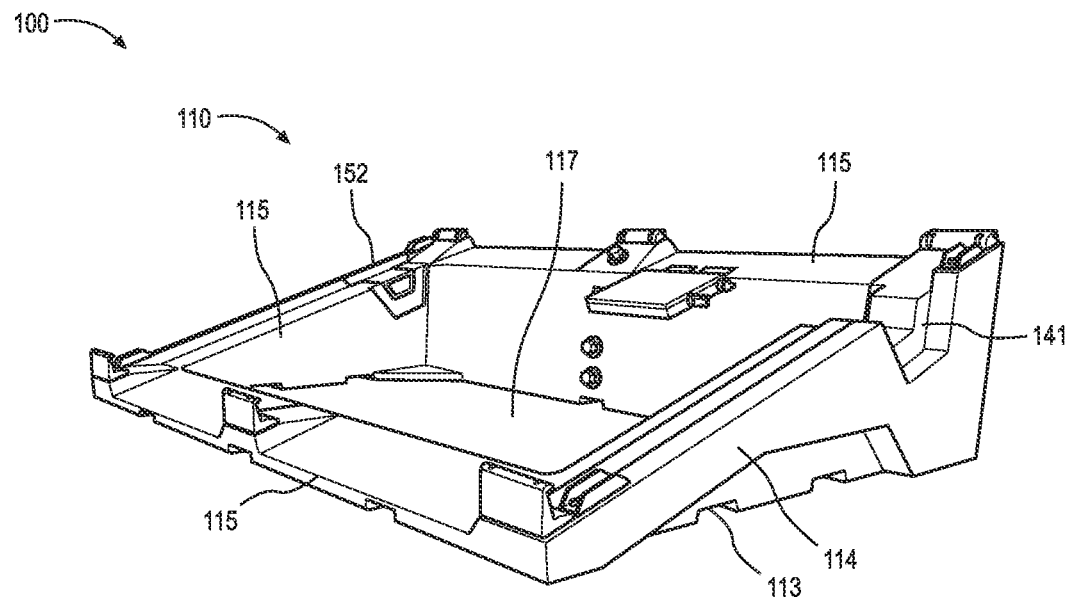
FIGS. 2A and 2B are schematic representations of one variation of the first system.
Figure 2B:
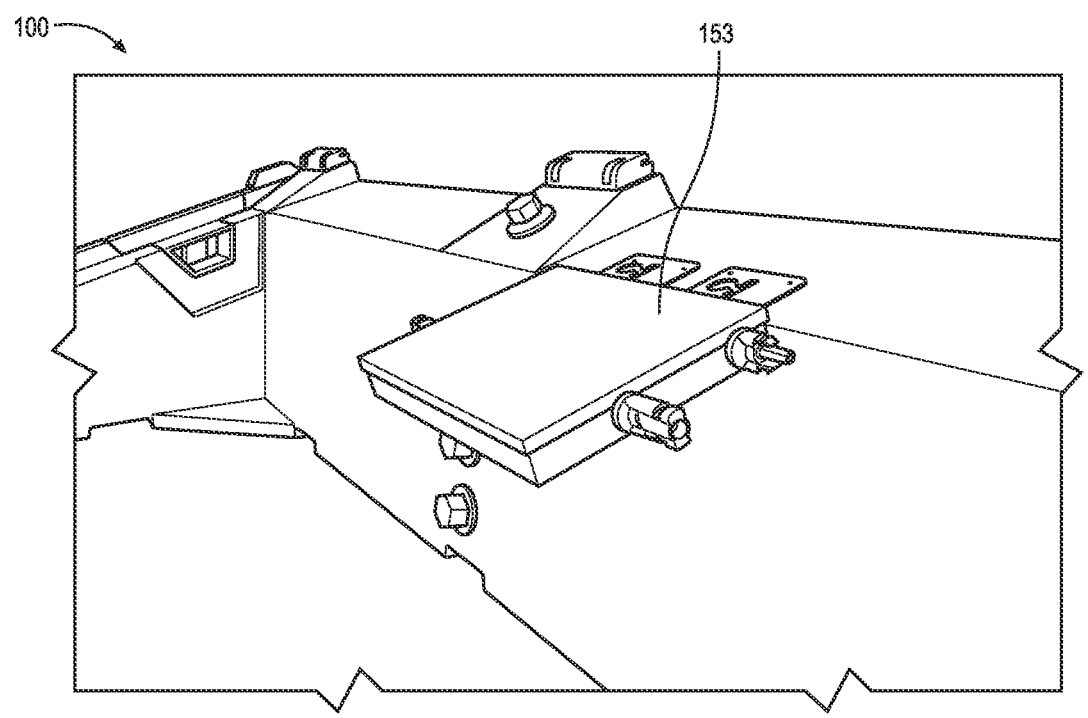

While FIGS. 1-2 illustrate the first system 100 in a "landscape" orientation in which the first system 100 is angled along its longer edge, in another implementation, the first system 100 can be angled along its shorter edge in a "portrait" orientation, such as is illustrated in FIGS. 3A-3E. An owner may select an orientation of the first system 100 based on features of their property, such as available area, shading on the property, a topography of the property, and other relevant information.

In one example, the first system 100 can include a rotating mount that rotatably secures a solar panel to the chassis, such that the solar panel can be rotated between a landscape orientation and a portrait orientation relative to the chassis. In this implementation, the chassis can define a body that is smaller than an area of the solar panel such that the chassis is generally concealed by the solar panel when in different orientations. Additionally and/or alternatively, the rotating mount can include a motor that electrically adjusts the orientation of the frame securing the solar panel (e.g., on a single axis). Additionally and/or alternatively, the solar panel can be rotated to a set of different angles between the landscape orientation and the portrait orientation. Accordingly, an owner can further customize the orientation of the first system 100 based on the features of their property.

1.6 Adjustable Solar Angle

Figure 3D:
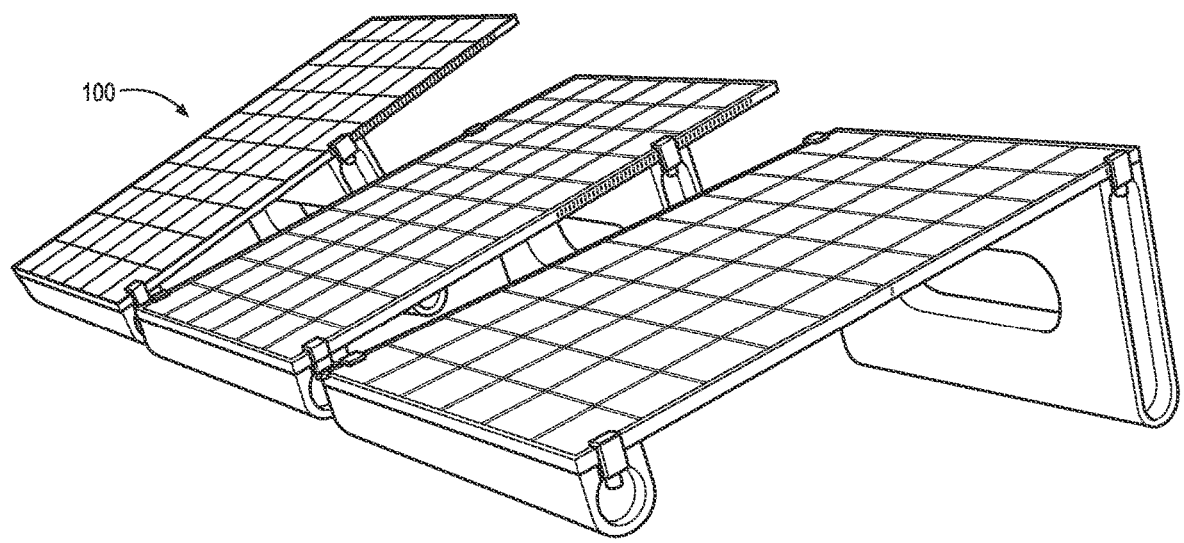
Figure 3E:
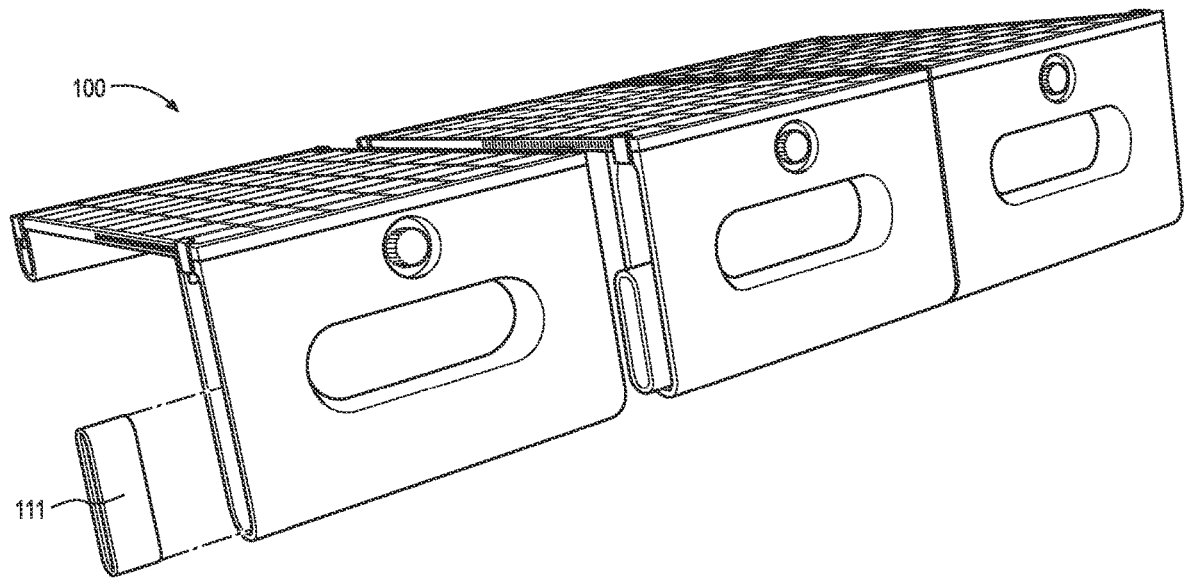

Generally, the first system 100 defines a solar angle of the solar panel secured to the first system 100, the solar angle representing the angle at which the solar panel is rotated about its horizontal axis. While FIGS. 1-2 illustrate the first system 100 defining a solar angle of 18 degrees (defined by the tapered angle of the lateral walls of the chassis), in other implementations, the first system 100 can enable the owner to adjust and customize the solar angle of the solar panel secured to the first system 100, such as is illustrated in FIG. 3D.

In one implementation, the first system 100 can include a set of preset angle variations for adjusting the orientation of the solar panel mounted to the first system 100 to different solar angles, for example, based on a location of the first system 100 (e.g., latitudinal and longitudinal coordinates), day-to-day weather conditions, topographical features of the property of the owner, and other relevant factors. For example, the first system 100 can orient the solar panel at solar angles of 0, 10, 20, 30, −10, −20, −30 degrees (relative to the base of the first system 100) or other suitable angles for capturing a sufficient amount of sunlight (e.g., above a defined threshold based on current weather conditions, such as at least 80% of the expected amount of sunlight).

In one example, the first system 100 can include: a single axis gimbal mount that connects the solar panel receptacle to the chassis and enables rotation of the solar panel relative to the chassis along an axis of the solar panel (e.g., a horizontal axis, i.e., "roll"). The first system 100 can further include a rotatable handle on a side of the first system 100 that connects to the single axis gimbal mount and enables an owner to adjust the solar panel to a desired solar angle (e.g., by turning the handle clockwise or counter-clockwise to tilt the solar panel). In another example, the first system 100 can include a double axis gimbal mount that connects the solar panel receptacle to the chassis and enables an owner to adjust the solar panel along two axes of the solar panel (e.g., a horizontal axis and a vertical axis, i.e., "roll" and "pitch"). The solar panel receptacle and gimbal mount can be nested within the top portion of the chassis such that, at any angle of the solar panel, the edges of the solar panel remain nested within the chassis (i.e., no exposed edges) to avoid gaps between the solar panel and the chassis and to maintain the security of the solar panel and any components (e.g., battery) secured within the storage chamber of the chassis.

In another example, the first system 100 can include: a sliding track attached to a top portion of the chassis walls along which the solar panel receptacle could adjustably slide and lock the solar panel into position at a desired solar angle. The solar panel receptacle can further include a handle that enables an owner to grasp the solar panel receptacle and position the solar panel and varying positions along the sliding track, each position securing the solar panel at a different solar angle.

Additionally and/or alternatively, the first system 100 can include a motorized mount connected to the solar panel and/or solar panel receptacle to electrically adjust the solar angle of the solar panel (e.g., on a single axis or double axes). For example, the motorized mount can adjust the solar angle throughout a day based on an orientation of the sun as it moves throughout the sky on a given day. Additionally and/or alternatively, the first system 100 can monitor an amount of light received by the solar panel (e.g., via an integrated sensor and/or an amount of electricity produced by photovoltaic cells of the solar panel) and modify the solar angle of the solar panel such that the amount of electricity produced exceeds a defined threshold.

In one implementation, the first system 100 can include a bubble level with a set of indicators for different angles to which an owner can adjust the solar panel. The bubble level can be arranged on an external face of the first system 100, on the frame securing the solar panel, and/or on the solar panel. Additionally and/or alternatively, an owner can reference the bubble level during an installation of the first system 100 to determine if the first system 100 is installed at a level angle relative to the ground.

1.7 Integrations

Additionally and/or alternatively, the first system 100 can integrate with a phone application and/or software platform that enables an owner to install, monitor, adjust, and/or maintain their solar panel first system 100. The first system 100 can include a set of different types of sensors that capture relevant data about the first system 100 and transmit the data to the integrated application, which can then transmit information and analysis to the owner for optimizing the performance of their first system 100 during installation and/or over a period of operating time of the first system 100.

In one implementation, the integrated application can transmit information and/or recommendations to owners to facilitate the installation process of the first system 100. For example, the integrated application can utilize techniques such as augmented and/or mixed reality (to visualize an owner's property) and/or machine learning to generate recommendations for an optimal placement of the first system 100 on an owner's property (e.g., based on an amount of available sunlight, a type of soil, a topographical analysis of the property, and other factors), a potential size of solar panels for the owner's property, a potential orientation of the solar panels, and other relevant recommendations.

In one implementation, the integrated application can transmit instructions to the first system 100. For example, if the first system 100 includes a solar panel frame connected to a motorized mount, an owner may select a solar angle and/or orientation via the integrated application and remotely adjust the solar angle and/or orientation of their first system 100 (e.g., if the owner: is away on vacation, detects upcoming weather events, or wants to improve the performance of their solar panel first system 100).

In another implementation, the integrated application can monitor a performance of the solar panels based on an amount of sunlight absorbed by the panels and/or an amount of electricity produced and/or converted by the first system 100 (e.g., by a set of sensors within the first system 100 that monitor an amount of electricity produced and/or converted by the solar panel. For example, the integrated application can: detect a decrease in performance of the solar panel first system 100 over a period of time (due to seasonal weather changes, upgrades and/or maintenance needed to the first system 100, changes to the available sunlight on the property, and other factors); generate recommendations to increase the output in electricity of the solar panel first system 100 by rotating or moving the first system 100, repairing and/or upgrading the first system 100, and/or washing the solar panel; and transmit the recommendations to a device (e.g., a mobile computing device, laptop, and/or desktop) of the owner.

Additionally and/or alternatively, the first system 100 can include a compass sensor that captures orientation data (e.g. latitudinal and/or longitudinal coordinates, latitudinal and/or longitudinal rotation) of the first system 100 and/or the solar panel secured to the first system 100. The integrated application can interpret and factor in the orientation data into its recommendations for optimal placement and/or orientation of the first system 100.

1.8 Location Tracking

An owner may select different types of customizations for the modules (i.e., connector module, utility module, direct-power module). For example, different types of sensors can be embedded within one or more of the modules according to the needs of the owner (e.g., one or more of the sensors described above).

In one example, one or more of the modules can include an accelerometer configured to detect movement of the first system 100. In response to detecting movement via the accelerometer, the first system 100 can flag the event and transmit an alert to the owner. In one example, the first system 100 can transmit the alert in response to detecting movement above a predefined threshold (i.e., due to severe weather conditions and/or tampering or theft of the first system 100).

Additionally and/or alternatively, one or more of the modules can include a Wi-Fi-enabled and/or a cellular/GPS-enabled chip to track the position of the first system 100. In one example, the first system 100 can: activate the cellular/GPS-enabled chip to track the position of the first system 100 in response to the first system 100 detecting movement above a predefined threshold; and transmit an alert to the owner indicating the detected movement, thereby enabling an owner to determine a location of the first system 100 when a particular event occurs.

In one implementation, the set of sensors can integrate with the phone application and/or software platform described herein, such that the owner can receive alerts and stay informed about the status of their first system 100, even while away from the property on which the first system 100 is installed.

1.9 Roof Variation

In one implementation, the first system 100 can serve as a roof mount for securing a solar panel atop a pitched roof of a property building. In this implementation, the first system 100 can include a set of hooks and/or loops within the chassis such that a first unit of the first system 100 can be arranged on a first side of a pitched roof, a second unit of the first system 100 can be arranged on a second side of the pitched roof, and a set of cables can connect the first unit of the first system 100 and the second unit of the first system 100 via the hooks and/or loops (i.e., the first and second units of the first system 100 straddle the peak of the roof and counterbalance each other). In this implementation, the chassis can include walls that are tapered at a different angle to account for the pitch angle of the roof (e.g., a 5-degree slope). Accordingly, the first system 100 for the pitched roof can secure a set of solar panels to a roof without perforating the roof and creating concerns and/or anxiety for the property owner/tenant about potential damage to the roof. Additionally and/or alternatively, the first system 100 can include components for an adjustable solar angle as described herein, such that the solar angle of the first system 100 can be conveniently customized for a particular pitch angle of a property building.

2. Second System

A second system 200 for securing and locating a solar panel for harvesting energy from incident sunlight includes: a module base 210; and a solar panel 290.

The module base 210 includes: a left component 220 defining a left triangular structure with a left front edge of a front height, a left rear edge of a rear height greater than the front height and set of left intra-assembly features 221; a right component 230 defining a right triangular structure with a right front edge of the front height, a right rear edge of the rear height and set of right intra-assembly features 231; a front fascia component 240 configured to couple to the left component 220 via the set of left intra-assembly features 221, configured to couple to the right component 230 via the set of right intra-assembly features 231 and defining a front ballast support surface 241; a rear fascia component 250 configured to couple to the left component 220 via the set of left intra-assembly features 221, configured to couple to the right component 230 via the set of right intra-assembly features 231, and defining a rear ballast support surface 251; a front ballast 260 defining a front enclosed volume configured to retain a front volume of fluid and configured to seat on the front ballast support surface 241 to load a front section 211 of the module base 210; a rear ballast 270 defining a rear enclosed volume configured to retain a rear volume of fluid and configured to seat on the rear ballast support surface 251 to load a rear section 212 of the module base 210; a front panel retention structure 243 fixed to a front section upper surface 213 of the module base 210 and configured to retain a front edge 294 of a solar panel 290 on the module base 210; and a rear panel retention structure 282 fixed to a rear section upper surface 214 of the module base 210 and adjustable over a range of longitudinal positions to retain the rear edge 292 of the solar panel 290 on the module base 210.

In another implementation, the second system 200 includes all the same components except for the ballasts and ballast supports surfaces, the system being self-ballasted.

2.1 Applications

Similar to the first system 100 described above, the second system 200 forms a module base 210 configured: to receive and secure a solar panel 290; to locate the solar panel 290 at a particular location, such as on a ground area or on a flat or low-sloped roof; and to orient the solar panel 290 at a particular (fixed) angle at which the solar panel 290 harvests energy from incident sunlight. The second system 200 is: configured to pack flat in a storage configuration for storage and shipment of the second system 200; and configured to assemble via a set of intra-assembly features without the use of tools. The second system 200 ships with empty ballast configured to insert into and be constrained by the module base 210. The ballast accepts and seals within the ballast a non-rigid ballast material (i.e., a volume of water) to weigh down the module base 210 and prevent unintended movement while in operation. In another implementation, the ballast, 260, 270 is configured to ship secured to a portion of the module base. In another implementation, the ballast is an integral part of the module base, 210 or its components.

The module base 210 includes a set of solar panel retention structures that guide, support, and constrain a solar panel 290 on the module base 210. The front panel retention structure 243 is fixed to a forward section 240 of the module base 210 and defines a clamping feature capable of accommodating and securing solar panels 290 of a range of thicknesses. The rear panel retention structure 282 is fixed to a closing panel 286 of the module base 210 and defines a channel 252 and a retention insert 253 configured to run along the channel 252 and is thereby adjustable over a range of longitudinal positions to accommodate solar panels of various lengths. The retention insert 253 couples to a rear clamping feature 255 capable of accommodating and securing solar panels with a range of thicknesses. The channel 252 also functions to transport moisture away from the retention insert 253 and the underside of the solar panel 290, and deposit it below the solar panel 290.

The module base 210 includes upper relief sections 222, 232 and lower relief sections 223, 233 that: provide areas that accept a human appendage (i.e., a hand or a foot) while assembling the second system 200; and provide passive ventilation between the interior and exterior of the module base 210 during operation of the second system 200. In one variation, the module base 210 can include integral stiffening ribs. The stiffening ribs can be separate components that are attached or adhered to the rear fascia component 250 or the forward section 240, left component 220, or the right component 230.

The module base 210 includes an electrical port 224 through which an electrical output connected to the solar panel 290 passes to be connected to an adjacent module base 210, or an external device that requires power.

The lower edges of module base 210 components include a set of adjustable contact surfaces 299 that engage an uneven surface at individual distances in order to facilitate stable contact with the uneven terrain. The module base 210 also includes a set of latches 229 (and corresponding latch receivers 239) that can be engaged individually or collectively to ensure a target gap is maintained at one edge between two adjoined module bases in an array configuration, and simultaneously allow a variable gap between an opposite edge. The latches can be engaged in different combinations in different pairs of module bases in order to allow the array to flex with the contour of an undulating surface, including both concave and convex segments. In one implementation, the target gap is defined as less than the nominal thickness of a human hand, to reduce the likelihood of unintended contact with the electrical connection passing between any two module bases, and thereby reduce the likelihood of potential injury.

The module base 210 can be disassembled and re-arranged in the flat pack configuration for storage when not in use. The ballast can be drained and removed from the module base 210 during disassembly, and the module base 210 components can disengage without the use of tools. However, in some variations, the module base 210 components can be assembled with intra-assembly features that accept tools.

2.2 Single Module

Generally, the module base 210 components arrive at the user's destination, arranged in a nested configuration in a storage case 202.

In one implementation as shown in FIG. 6A-6D, the second system 200 includes a storage case 202 in which the left component 220 and the right component 230 are configured to nest in the storage case 202 with the left top edge of the left component 220 facing the right top edge of the right component 230 for shipping; and the front ballast 260, rear ballast 270, front façade, and rear fascia are configured to nest below the left component 220 and the right component 230 in the storage case 202 for shipping. In the present implementation, the left component 220, right component 230, front component, rear component, and closing panel 286 are each formed as a hollow molded polymer part.

The storage case 202 opens to display a first layer of components nested within the storage container including the left component 220 and the right component 230, the left component 220 arranged with the top edge of the left component 220 adjacent to the top edge of the right component 230. The left component 220 and the right component 230 separate from the storage case 202 to display a second layer of components in the storage case 202 including the front ballast 260, rear ballast 270, front fascia component 240, rear fascia component 250, and closing panel 286, arranged in a nested configuration within the storage case 202. The components in the second layer separate from the storage case 202 and assemble into the module base 210 by connecting the left component 220 to a first end of the front fascia component 240 and a first end of the rear fascia component 250 via a set of intra-assembly features; and connecting the right component 230 to a second end of the front fascia component 240 and a second end of the rear fascia component 250 via the set of intra-assembly features.

2.2.1 Intra-Assembly Features

In one implementation as shown in FIG. 6D, the set of intra-assembly features 221, 231 includes a set of fasteners and a set of receivers. Each fastener is configured to pass through a first component and insert within the corresponding receiver of a second component and affix the first component to the second component. In one variation, the set of intra-assembly features includes a threaded bolt as the fastener and a threaded nut as the receiver. In another variation, the set of intra-assembly features includes a threaded bolt including hand-tightening wings as the fastener, configured to pass through a first component and insert within a threaded recess in the second component, thereby affixing the first component to the second component. In another variation, the fastener is a quick-connect fastener, such as a cam-hasp fastener, and the receiver is a latch. However, the second system 200 can include any suitable method of quickly and repeatably connecting and disconnecting a first component and a second component.

2.2.2 Ballast

Figure 6A:
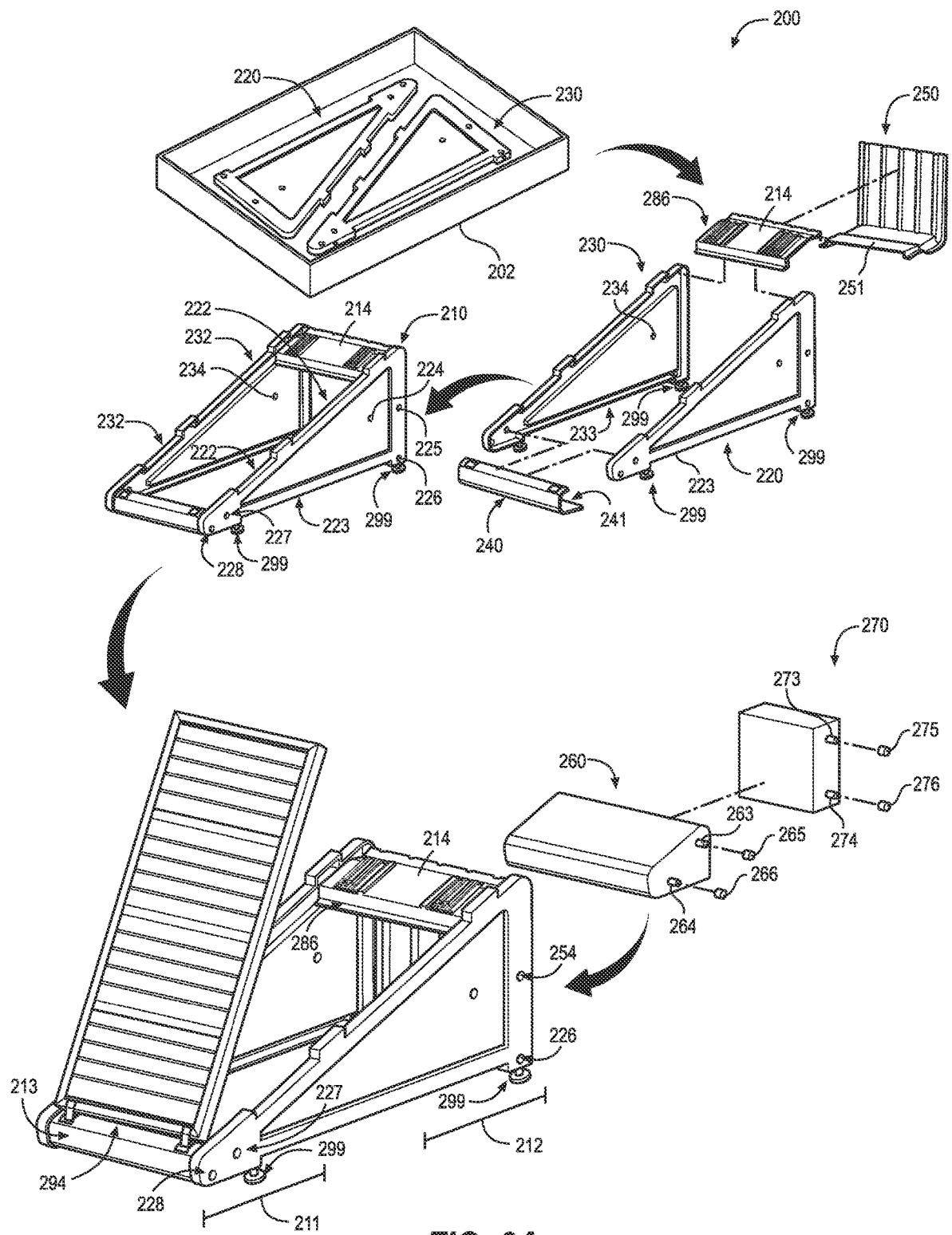
FIG. 6A is a is a flowchart representation of one variation of the second system.

As shown in FIG. 6A-6B, the front fascia component 240 defines a front ballast support surface 241, and the rear fascia component 250 defines a rear ballast support surface 251. The front ballast 260 defines a front enclosed volume configured to retain a front volume of fluid and is configured to seat on the front ballast support surface 241 to load a front section 211 of the module base 210. The rear ballast 270 defines a rear enclosed volume configured to retain a rear volume of fluid and is configured to seat on the rear ballast support surface 251 to load a rear section 212 of the module base 210. The left component 220 defines: a rear ballast fill window 225 proximal the rear edge of the left component 220, a rear ballast drain window 226 proximal the rear edge of the left component 220 and below the rear ballast 270 fill window 225, a first front ballast fill window 227 proximal the first front edge of the first left component 220, and a first front ballast drain window 226 proximal the first front edge of the first left component 220 and below the first front ballast fill window 227.

As shown in FIG. 6A, the rear ballast 270 defines: a rear ballast fill neck 273 configured to align with the rear ballast fill window 225, and a rear ballast drain neck 274 configured to align with the rear ballast drain window 226 of the left component 220 when the rear ballast 270 inserts into the rear fascia component 250 and rests on the rear ballast support surface 251. A rear ballast fill cap 275 configured to install on the rear ballast fill neck 273 and accessible through the rear ballast fill window 225 of the left component 220 to fill the rear ballast 270 with the rear volume of fluid, and a rear ballast drain cap 276 configured to install on the rear ballast drain neck 274 and accessible through the rear ballast drain window 226 to drain the rear volume of fluid from the rear ballast 270.

As shown in FIG. 6A, the front ballast 260 defines: a front ballast fill neck 263 configured to align with the front ballast fill window 227 of the left component 220, and a front ballast drain neck 264 configured to align with the front ballast drain window 228 of the left component 220 when the front ballast 260 inserts into the front fascia component 240 and rests on the front ballast support surface 241. The second system 200 further includes a front ballast fill cap 265 configured to install on the front ballast fill neck 263 and accessible through the front ballast fill window 227 to fill the front ballast 260 with the front volume of fluid, a front ballast drain cap 266 configured to install on the front ballast drain neck 264 and accessible through the front ballast drain window 228 to drain the front volume of fluid from the front ballast 260.

The rear ballast fill cap 275 detaches from the rear ballast 270 fill neck 273. A liquid source, such as water from the user's garden hose, connects to the rear ballast 270 fill neck 273, and the rear ballast 270 fills with a volume of liquid. The rear ballast fill cap 275 attaches to the rear ballast fill neck 273 to seal the rear ballast 270 and prevent loss of liquid. The same procedure is repeated for the front ballast 260 fill cap 265, front ballast 260 fill neck 263, and front ballast 260. However, in another implementation, the location of fill necks, drain necks, fill windows and drain windows of the ballasts can locate in an area other than the left component, facing external to the module base 210.

2.2.3 Closing Panel in one implementation as shown in FIG. 6A-6B, a first end of the closing panel 286 connects to the left component 220 via the set of intra-assembly features 221, and a second end of the closing panel 286 connects to the right component 230 via the set of intra-assembly features 231. The closing panel 286 is configured to install between the left component 220 and the right component 230 proximal the rear fascia component upper surface 214 of the module base 210 and configured to extend under the rear edge 292 of the solar panel 290. The rear panel retention structure 282 is mounted to the top surface of the closing panel 286. In one variation, the module base 210 includes two rear panel retention structures, a left rear panel retention structure 282 and a right rear panel retention structure 282. The left rear panel retention structure 282 is mounted to a left section of the closing panel 286 and the right rear panel retention structure 282 is mounted to a right section of the closing panel 286.

In one variation, the rear panel retention structures 282 retain the solar panel at an offset distance from the top surface of the closing panel. The offset distance permits passive ventilation from the exterior of the first module base 210 to the interior of the module base 210, proximal the rear edge 292 of the solar panel 290.

2.2.4 Solar Panel Installation and Relief Sections

Generally, the left component 220 of the module base 210 includes: a left front lower protrusion located proximal the front left edge and extending normal from the left lower edge of the left component 220, and a left rear lower protrusion located proximal the rear left edge and extending normal from the left lower edge of the left component 220. The right component 230 of the module base 210 includes:

a right front lower protrusion located proximal the front right edge and extending normal from the right lower edge of the right component 230, and a right rear lower protrusion located proximal the rear right edge and extending normal from the right lower edge of the right component 230. The module base 210 further includes: left lower relief sections 223 between the left lower protrusions, and right lower relief sections 233 between the right lower protrusions to accommodate footwear during installation of the solar panel 290 on the module base 210.

Figure 5:
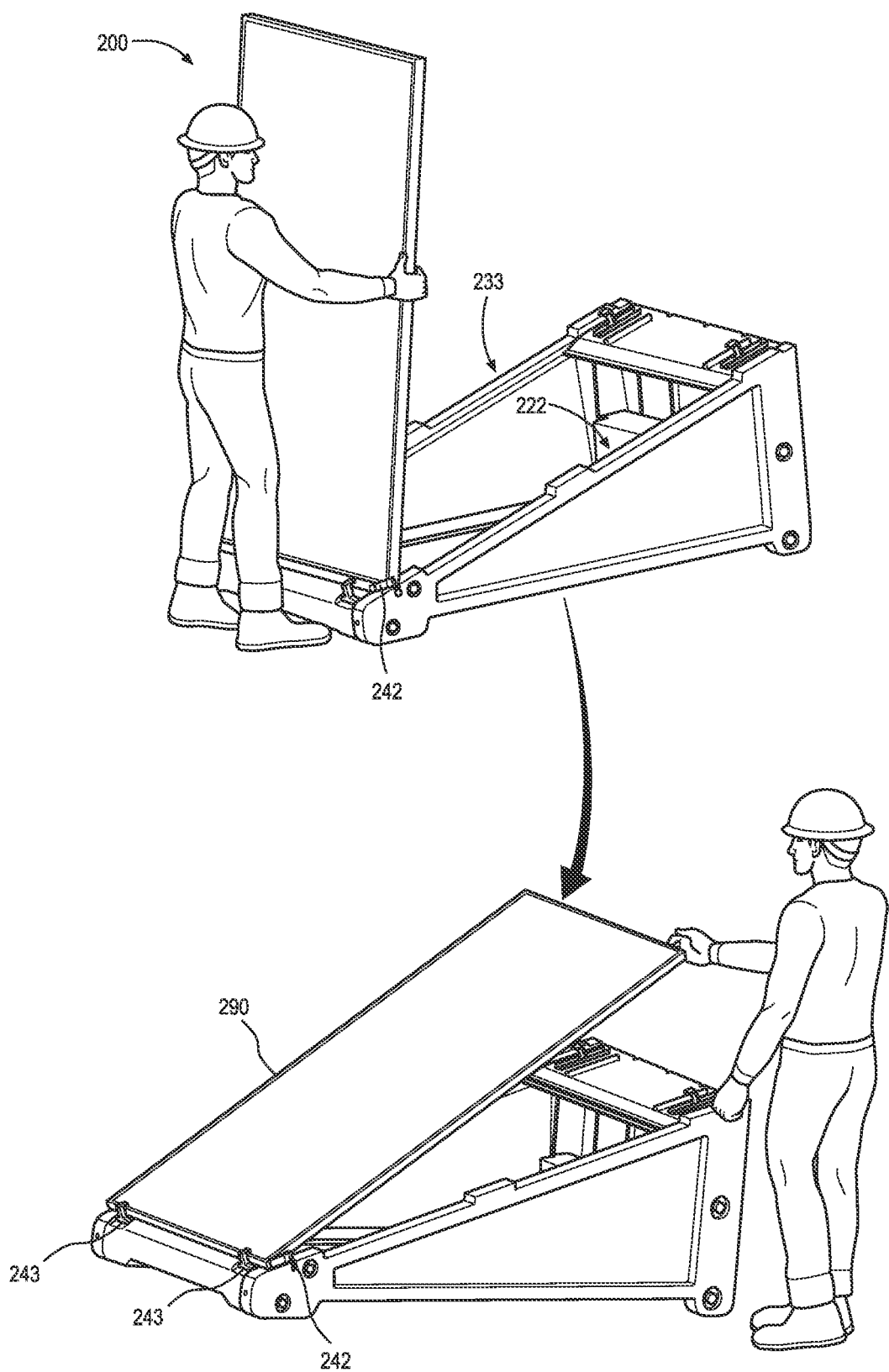
FIG. 5 is a is a flowchart representation of one variation of the second system.
Figure 7:
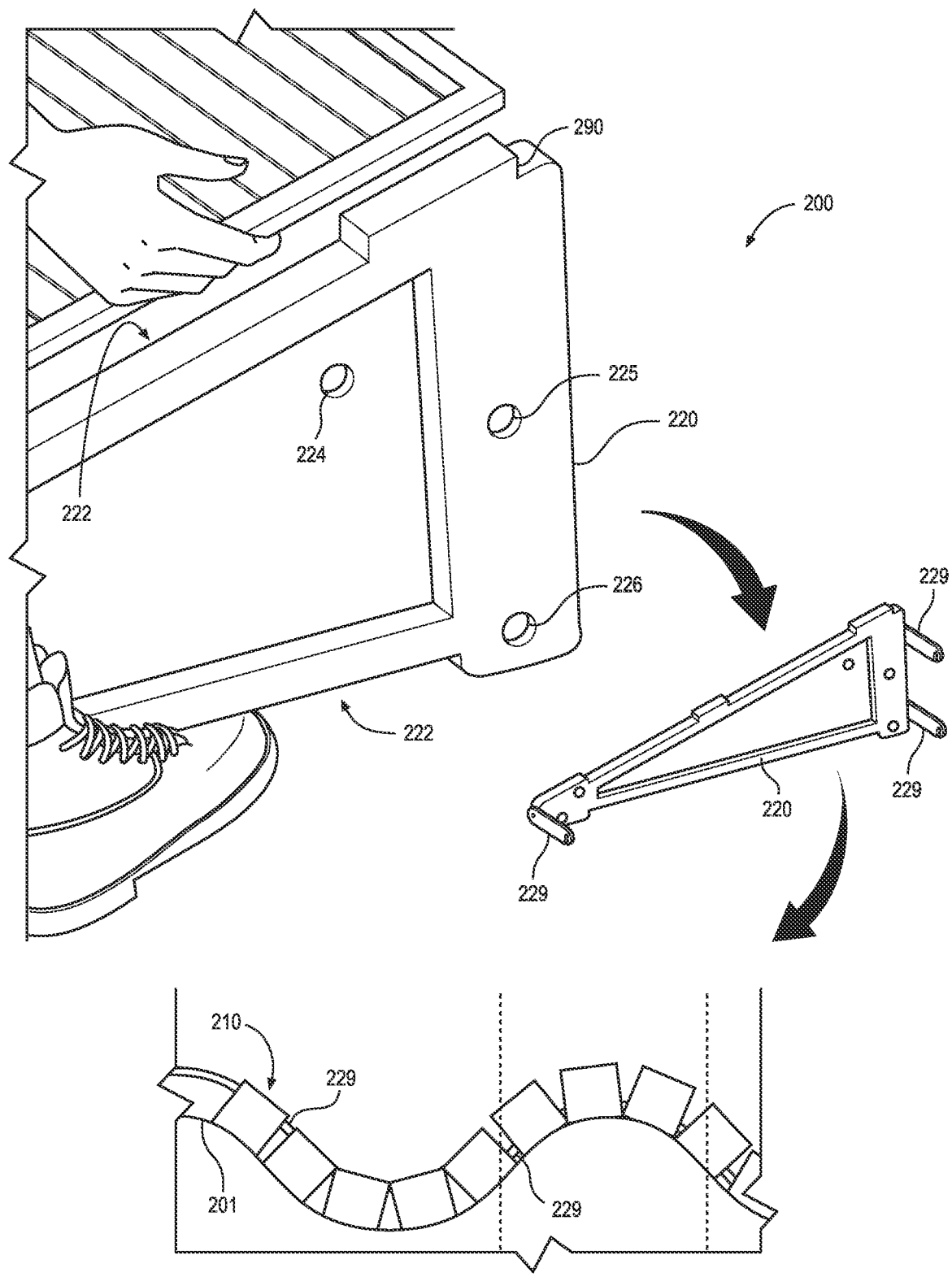
FIG. 7 is a is a flowchart representation of one variation of the second system.

As shown in FIGS. 5 and 7, the user transports the solar panel 290 to the module base 210—which is now weighed down by the filled ballast—and the user's foot inserts into the left lower relief section 222 of the module base 210 as the user steps proximal the module base 210. Therefore, the left lower relief section 222 reduces the likelihood of injury occurring to the user's foot and reduces the likelihood that the user will lose balance while manipulating a heavy load—such as the solar panel 290—a distance from the user's center of gravity, potentially causing a fall or further injury.

The module base 210 includes: left upper relief sections 222 between the upper protrusions of the left component, and right upper relief sections 232 between the right upper protrusions. Each upper relief section 222, 232 is configured to receive a hand (between the upper protrusions) during installation of the solar panel 290 on the module base 210. When the distance between the lower face of the solar panel 290 and the upper edge of an upper protrusion of the left component 220 becomes less than the nominal width of a human hand, the upper relief section 222 of the left component 220 accepts the user's hand, reducing the likelihood of injury.

Figure 4:
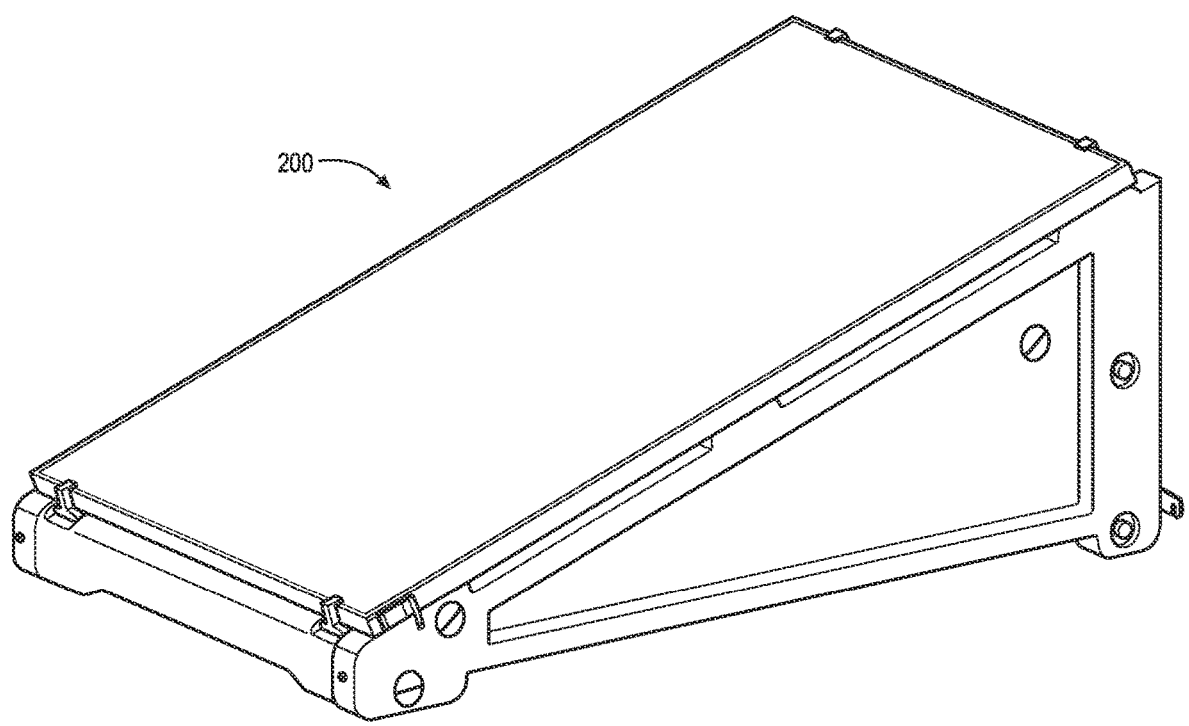
FIG. 4 is a is a schematic representation of one variation of a second system.

The user places the front edge 294 of the solar panel 290 on the forward panel retention structure, with the aid of a set of spring elements fixed to the left component 220 and the right component 230. The module base 210 includes: spring elements 242 fixed to the left component 220 proximal the upper front edge, and fixed to the right component 230 proximal the upper front edge and configured to cooperate with together to center the solar panel 290 on the module base 210 and to guide the front edge 294 of the solar panel 290 into the front panel retention structures 243 during installation of the solar panel 290 on the module base 210. The user maneuvers the front edge 294 of the solar panel 290 toward the front section 211 of the module base 210 and maneuvers the solar panel 290 into contact with a first spring element 242. The first spring element 242 exerts a force on the solar panel 290, guiding the solar panel 290 toward and into contact with the second spring element 242, centering the solar panel 290 on the module base 210. The user then maneuvers the front edge 294 of the solar panel 290 into contact with a front panel retention structure 243. Once the front edge 294 of the solar panel 290 is centered on the module base 210 and in contact with the front panel retention structure 243, the user pivots the solar panel 290 such that the rear edge 292 of the solar panel 290 travels toward the rear panel retention structure 282 of the module base 210. As the user lowers the solar panel 290 toward the rear section 212 of the module base 210, the user's hand is received by the upper relief section 222, 232. The rear panel retention structure 282 is adjusted to the dimension of the solar panel 290, and the clamping feature is tightened. The assembled power generation unit is shown in FIG. 4.

2.2.5 Panel Retention Structures

Generally, the module base 210 includes a front panel retention structure 243, fixed to a front section upper surface 213 of the module base 210 and configured to retain a front edge of a solar panel 290 on the module base 210. In one implementation, the front panel retention structure 243 includes: a retention base defining a threaded through bore and fixed to the front section upper surface 213 of the module base 210; a retention fastener defining a clamping feature and a threaded shaft and configured to insert into the threaded through bore of the retention base. The retention base is configured such that a distal end of the threaded shaft can extend beyond the lower surface of the threaded through bore, allowing the front panel retention structure 243 to constrain solar panels of different thicknesses. In one variation, the module base 210 can include a left front panel retention structure 243 and a right front panel retention structure 243.

Figure 10:
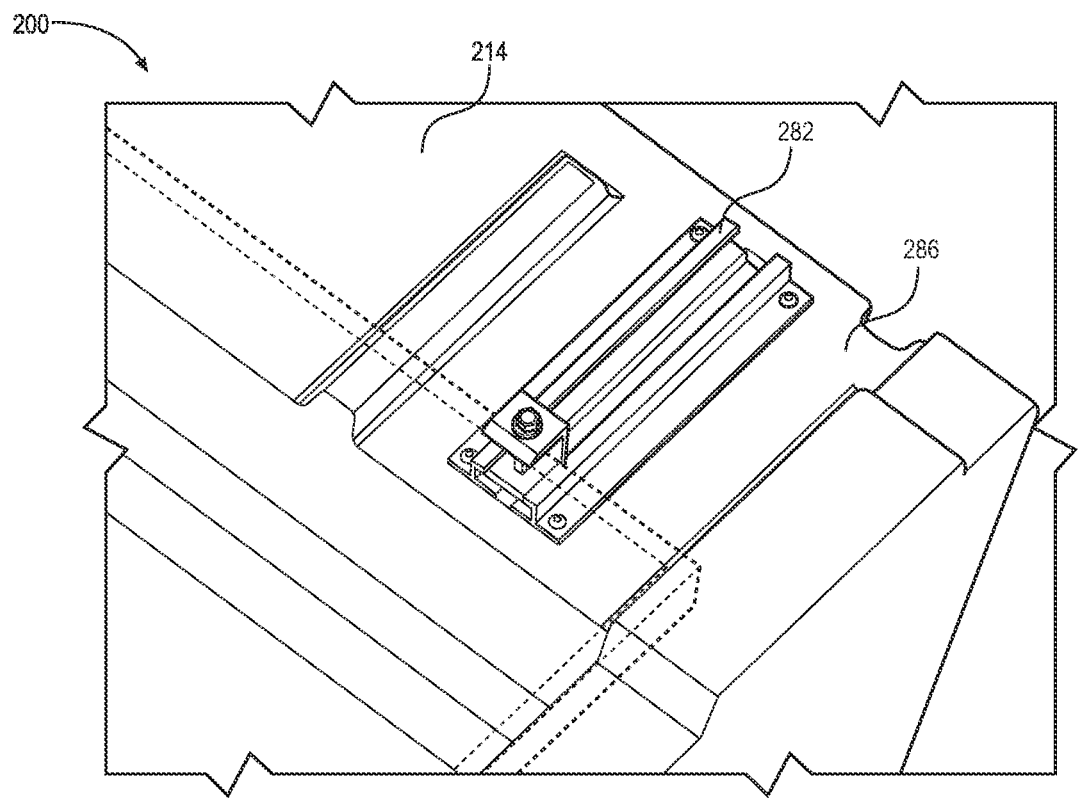
FIG. 10 is a is a schematic representation of one variation of the second system.
Figure 11:
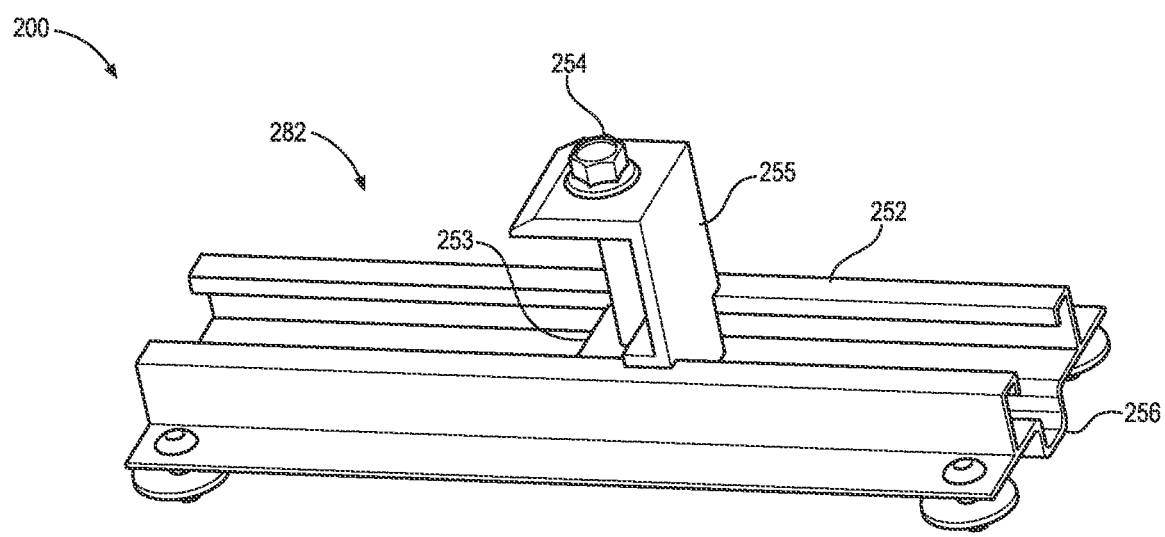
FIG. 11 is a is a schematic representation of one variation of the second system.

In one implementation as shown in FIG. 10 and FIG. 11, the module base 210 includes a rear panel retention structure 282 that defines a channel 252 extending along a longitudinal axis between and parallel to the left component 220 and right component 230 of the module base 210, and configured to carry moisture away from a lower surface of the solar panel 290; a rear retention fastener 254; a rear clamping feature 255 mounted with rotational freedom to the rear retention fastener 254; and a rear retention insert 253 constrained within the channel 252, configured to run longitudinally along the channel 252 and configured to accept the rear retention fastener 254.

In one implementation, the rear panel retention structure 282 includes: a channel 252 configured in a u-shaped cross-section (e.g., a Unistrut); and a rear clamping feature 255 configured to constrain the upper rear edge 292 of the solar panel 290 and configured to extend upwardly from the rear retention insert 253 and maintain an orientation perpendicular to the channel 252, and mounted to the rear retention fastener 254 such that the retention fastener 254 is free to rotate. The rear retention insert 253 can define a nut with a threaded bore, and the rear retention fastener 254 can define a threaded shaft (e.g., a bolt) configured to insert into the threaded bore of the rear retention insert 253.

In another implementation, the channel 252 can define a u-shaped cross-section with a recess 256 at the base of the "u," the recess configured to carry moisture away from the rear retention insert 253 and release moisture below and away from the solar panel 290. The recess 256 also functions as relief for the rear retention fastener 254, allowing the distal end of the rear retention fastener 254 to extend beyond the lower face of the threaded bore of the rear retention insert 253, thereby allowing the rear retention structure 282 to constrain panels of different thicknesses. In one variation, the module base 210 can include a rear left panel retention structure 282 and rear right panel retention structure 282.

In one variation, the rear panel retention structure 282 extends beyond the rear section upper surface 214 to retain a solar panel 290 with a longitudinal dimension greater than the longitudinal dimension of the upper surface of the first modular base. The channel 252 is configured to be oversized and extend beyond the rear edge of the closing panel 286 to provide a greater longitudinal distance for the rear retention insert 253 to travel, and thereby accommodate a solar panel 290 with a greater longitudinal dimension.

The solar panel 290 is secured to the module base 210 via the front panel retention structure 243 and the rear panel retention structure 282. The module base 210 defines an assembled width greater than the width of the solar panel 290. The left component 220 defines a width to extend under the left edge of the solar panel 290 to support the solar panel 290 and to extend outward beyond the left edge of the solar panel 290 to protect the edges of solar panels of different widths from impact. The first right component 230 similarly defines a width to extend under the right edge of the solar panel 290 and extend outward beyond the right edge of the solar panel 290. Once the solar panel 290 is secured, the module base 210 and the solar panel 290 form a power generation unit.

2.2.6 Power Generation Unit Use and Ventilation

Figure 9:
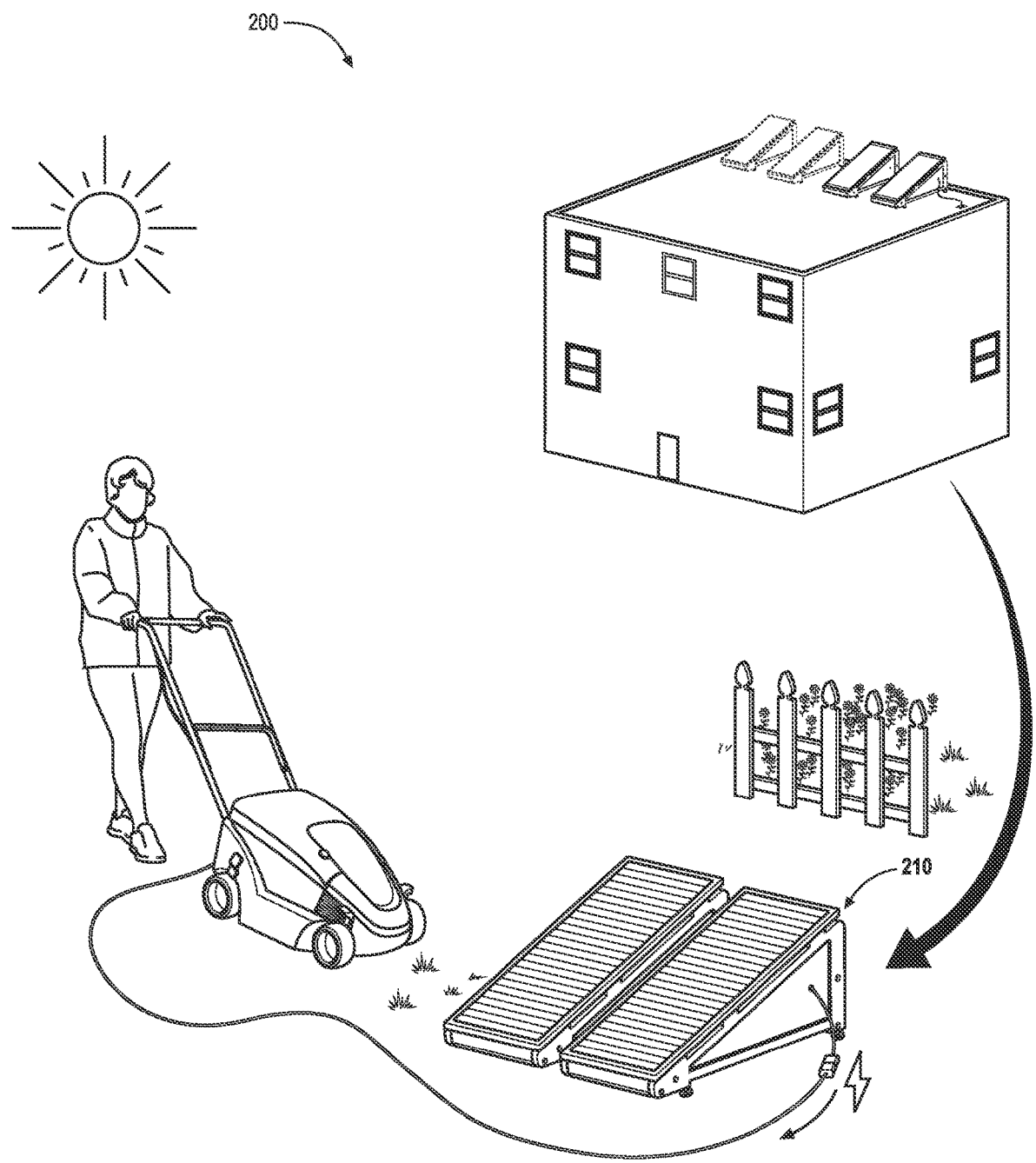
FIG. 9 is a is a flowchart representation of one variation of the second system.

In one example as shown in FIG. 9, a power output connection, connected to the solar panel 290, is passed through the electrical port on the left component 220. The user connects the power output connection to an electric weed trimmer and proceeds to trim weeds in the user's garden. While in operation, the left upper relief 222, left lower relief 223, right upper relief 232, and right lower relief 233, cooperate to accommodate additional passive ventilation between the interior of the first module base 210 and the exterior of the first module base 210.

In one implementation, the module base can include additional lower relief sections arranged at a lower edge of the front fascia component 240 and/or a lower relief section arranged at a lower edge of the rear fascia component 250, allowing passive ventilation between the interior of the module base 210 and the exterior of the first module base 210.

2.2.7 Disassembly and Storage

After weed trimming is complete, the power output disconnects from the weed trimmer, and the power output connection separates from the electrical port on the left component 220. The rear panel retention structures disengage to release the rear edge 292 of the solar panel 290. The left upper relief 222 in the left component 220 receives the user's hand, and the lower relief 223 of the left component 220 receives the user's foot. The user removes the solar panel 290 from the module base 210. The ballast drain cap detaches from the front ballast drain neck 264 and the front volume of liquid drains from the front ballast 260. When the front volume of liquid is drained, the front ballast drain cap 266 attaches to the front ballast 260 drain neck 264. In one variation, the front ballast 260 fill cap 265 also detaches from the front ballast 260 fill neck 263, and atmosphere vents into the front ballast 260, increasing the draining speed of the front volume of liquid. The front ballast 260 separates from the front ballast 260 retention structure. The front ballast drain cap 276 detaches from the rear ballast drain neck 274 and the rear volume of liquid drains from the rear ballast 270. When the rear volume of liquid is drained, the front ballast drain cap 276 attaches to the rear ballast 270 drain neck 274. In one variation, the front ballast fill cap 275 also detaches from the rear ballast 270 fill neck 273, and atmosphere vents into the rear ballast 270, increasing the draining speed of the rear volume of liquid. The rear ballast 270 removes from the rear ballast 270 retention structure. The closing panel 286 detaches from the right component 230 and the left component 220. The front fascia component 240 detaches from the right component 230 and the left component 220, and the rear fascia component 250 detaches from the right component 230 and the left component 220. The front ballast 260, rear ballast 270, front fascia component 240, rear fascia component 250, and closing panel 286, arrange in the nested configuration of the second layer within the storage case 202. The left component 220 and the right component 230 arrange in the nested configuration in the first layer above the second layer within the storage case 202 with the top edge of the left component 220 adjacent to the top edge of the right component 230. The storage case 202 is placed in a storage location until the next time the user requires power.

2.3 Second Module

In one example as shown in FIG. 9, the user procures a second module base 210 to support a second solar panel 290. In this variation, a first power generation unit is previously installed on the roof of the user's home and connected to her home to provide supplemental power. Upon receipt of the second module base 210, the user transports the components to the roof. The components assemble into a second module base 210 located adjacent to the first power generation unit, and a second solar panel 290 inserts into the front panel retention structure 243 and is constrained on the second module base 210 by the rear panel retention structure 282, thereby assembling a second power generation unit. The second power output of the second power generation unit is connected to the user's home. The user can now generate additional power compared to the power generated by the single power generation unit.

2.3.1 Connecting Module Bases

In one variation as shown in FIGS. 8A, 8B, 8E, and 8F, the first module base 210 and the second module base 210 can be connected via a set of latching mechanisms in order to maintain a target gap between the first module base 210 and the second module base 210. The left component 220 of the first module base 210 includes: a front latch 229 on the front edge, a rear latch 229 on the rear edge, and a left electrical port 224. The right component 230 of a second module base 210 is configured to abut the left component 220 of the first module base 210 and includes: a front latch receiver 239 on the front right edge of the right component 230 of the second module base 210 configured to engage the front latch 229 of the left component 220 of the first module base 210 and retain the front section of the first module base 210 adjacent to the front section of the second module base 210, a rear latch receiver 239 on the rear right edge of the right component 230 of the second module base 210 configured to engage the rear latch 229 of the left component 220 of the first module base 210 and retain the rear section of the first module base 210 adjacent to the rear section of the second module base 210, and a right electrical port 234 aligned with and configured to pass an electrical connection to the first left electrical port 224 of the left component 220 of the first module base 210. The front latch 229, front latch receiver 239, rear latch 229, and rear latch receiver 239 cooperate to constrain the first module base 210 and the second module base 210 proximal one another on a level surface.

In another variation as shown in FIGS. 8C, 8D, 8G, and 8H, the first module base 210 and second module base 210 are positioned on a non-planar terrain surface. The first module base 210 is configured to transiently locate on a nonplanar terrain surface, and the second module base 210 is configured to transiently locate on the nonplanar terrain surface adjacent the first module base 210. The front latch 229 and the rear latch 229 define a latch length configured to maintain a target gap between the lower edge of the left component 220 of the first module base 210 and the lower edge of the right component 230 of the second module base 210. The rear latch 229 and the rear latch receiver 239 cooperate to retain the lower edge of the left component 220 of the first module base 210 and the lower edge of the right component 230 of the second module base 210 when located on a convex section of the nonplanar terrain surface. The upper rear corner of the left component 220 of the first module base 210 and the upper rear corner of the right component 230 of the second module base 210 are not connected, enabling a variable gap between the upper rear corner of the left component 220 of the first module base 210 and the upper rear corner of the right component 230 of the second module base 210 to accommodate variance in the nonplanar terrain surface.

Generally, the target gap is selected to be less than the nominal thickness of a human child's hand, and the electrical port in the left component 220 and the electrical component in right component 230 are located at a distance greater than the nominal length of a human child's hand, to prevent a child (or adult) from inadvertently contacting the electrical connection passing through the electrical ports. The front latch 229 and the rear latch 229 cooperate to maintain the target gap between the lower edge of the left component 220 of the first module base 210 and the lower edge of the right component 230 of the second module base 210 less than a nominal human hand width. The left electrical port 224 is located at a distance from the upper edge of the left component 220 greater than a nominal human hand length; and the right electrical port 234 is located at a distance from the upper edge of the right component 230 greater than a nominal human hand length.

In yet another variation as shown in FIG. 7, the first module base 210 and second module base 210 are positioned on a concave non-planar terrain surface. The first left component 220 includes an upper latch 229 located at the upper rear corner of the left component 220 of the first module base 210. The right component 230 includes an upper latch receiver 239 at the upper rear corner of the right component 230 of the second module base 210. The first upper latch 229 and the second upper latch receiver 239 cooperate to retain the upper rear corner of the left component 220 of the first module base 210 and the upper rear corner of the right component 230 of the second module base 210 when both module bases are located adjacent to one another on a concave section of the nonplanar terrain surface. The upper latch 229 and upper latch receiver 239 cooperate to maintain a target gap between the upper rear corner of the left component 220 of the first module base 210 and the upper rear corner of the right component 230 of the second module base 210 less that a nominal human hand width. The left electrical port 224 is located a distance from the lower edge of the left component 220 greater than a nominal human hand length; and the right electrical port 234 is located a distance from the lower edge of the right component 230 greater than a nominal human hand length. In one implementation, the lower relief sections 223 and 233 can accommodate undulations in the terrain, reducing the likelihood of the module base 210 becoming high-centered or peaked on a raised contour of terrain. The module base 210 is prevented from rocking or tilting on a section of imperfectly flat terrain by accommodating undulations in the terrain via the lower relief sections and maintaining a set of points of contact with the terrain at the lower protrusions. In a variation of this implementation, lower relief sections are also included at the lower face of the front fascia component 240 and the lower face of the rear fascia component 250.

2.3.2 Adjustable Contact Surfaces

Further, to facilitate more convenient positioning of a module base 210 on uneven non-planar terrain, the module base 210 includes several adjustable contact surfaces 299. The front left lower protrusion includes an adjustable contact surface 299 arranged between the lower surface of the front left lower protrusion and the nonplanar terrain surface. The front right lower protrusion includes an adjustable contact surface 299 arranged between the lower surface of the front right lower protrusion and the nonplanar terrain surface. The rear left lower protrusion includes an adjustable contact surface 299 arranged between the lower surface of the rear left lower protrusion and the nonplanar terrain surface. The rear right lower protrusion includes an adjustable contact surface 299 arranged between the lower surface of the rear right lower protrusion and the nonplanar terrain surface.

For example, the user wishes to power lights decorating the large tree in the wintertime. The tree is located a distance from the user's house greater than a practical length of an extension cord. Additionally, since the daylight hours are short in winter, the amount of power a solar panel 290 can harvest is limited. The user decides to use two solar panels to harvest a greater amount of solar energy to power an energy storage cell that will provide power the lights at night. The user assembles two module bases near the tree, on a convex, undulating, non-planar terrain. The user adjusts the length of the adjustable contact surfaces of the first module base 210 and the second module base 210 such that each lower protrusion of each module base 210 is supported by an adjustable contact surface 299 in contact with the non-planar terrain. The user engages the front latch 229 of the first module base 210 with the front latch receiver 239 of the second module base 210, and similarly engages the rear latch 229 of the first module base 210 with the rear latch receiver 239 of the second module base 210, fixing the first module base 210 to the second module base 210 and maintaining the target gap between the left lower edge of the first module base 210 and the right lower edge of the second module base 210. The user places a solar panel 290 on each module base 210, producing two power generation units. The user passes the power output connection through the left electrical port 224 of the first module base 210 and through the right electrical port 234 of the second module base 210, thereby reducing potential inadvertent contact with the electrical connection. The user connects the power output from each power generation unit to the battery. The user then connects lights decorating the tree to the energy storage cell.

In another example, the user requires power to perform yard work in the garden, but also requires a power generation system connected to her home, such as a power generation unit on the roof. The user travels to the roof and disconnects the second power generation unit, removes the second solar panel 290, drains the front and rear ballast 270, and disassembles the second module base 210. The user transports the components of the second module base 210 and the second solar panel 290 to the garden. The user re-assembles the second module base 210, fills the front ballast 260 and the rear ballast 270, and places the second solar panel 290 onto the second module base 210 to reassemble the second power generation unit. The user connects the second power output to the electric weed trimmer and proceeds to trim weeds in the garden. When finished weed trimming, the user disconnects the second power generation unit, removes the second solar panel 290, drains the front and rear ballast 270, and disassembles the second module base 210. The user transports the components back to the roof, reassembles the second module base 210, refills the ballast, replaces the second solar panel 290, and reconnects the second power output to the home.

In another example, the user wishes to power a pair of electric shears for pruning and a speaker in the garden so the user may listen to music while performing gardening tasks. The user assembles two module bases and fills the front and rear ballast 270 near a large tree that requires pruning, on a concave, undulating, non-planar terrain. The user adjusts the length of the adjustable contact surfaces of the first module base 210 and the second module base 210 such that each lower protrusion of each module base 210 is supported by an adjustable contact surface 299 in contact with the non-planar terrain. The user engages the upper latch 229 of the first module base 210 with the upper latch receiver 239 of the second module base 210, fixing the first module base 210 to the second module base 210 and maintaining the target gap between the left upper rear corner of the first module base 210 and the right upper rear corner of the second module base 210. The user places a solar panel 290 on each module base 210, producing two power generation units. The user passes the power output connection through the left electrical port 224 of the first module base 210 and through the right electrical port 234 of the second module base 210, thereby reducing potential inadvertent contact with the electrical connection. The user connects the power output from the first power generation unit to the electric shears and connects the power output from the second power generation unit to the speaker.

2.3.3 Electrical Connections

Generally, the left component 220 and the right component 230 of the module base 210 include a left electrical port 224 and right electrical port 234, respectively. The left electrical port 224 and the right electrical port 234 are arranged symmetrically and uniformly such that, when a first module base 210 is arranged adjacent to a second module base 210, the left electrical port 224 is aligned to the right electrical port 234, and an electrical connection of minimal length can pass between the left electrical port 224 and the right electrical port 234. In one variation, the left electrical port 224 and the right electrical port 234 are positioned a distance away from the upper edge of the module base 210 greater than the nominal length of a human hand. Thus, when the first module base 210 and the second module base 210 are connected via an upper rear latch 229 and upper rear latch receiver 239, the position of the electrical port cooperates with the target gap maintained by the upper rear latch 229 and upper rear latch receiver 239 to reduce the likelihood of inadvertent contact with the electrical connection between the first module base 210 and the second module base 210. In another variation, the left electrical port 224 and the right electrical port 234 are positioned a distance away from the lower edge of the module base 210 greater than the nominal length of a human hand and cooperate with the target gap maintained by the front latch 229 and front latch receiver 239 in cooperation with the rear latch 229 and rear latch receiver 239, to reduce the likelihood of inadvertent contact with the electrical connection. In yet another variation, the left electrical port 224 and the right electrical port 234 are positioned a distance away from the rear edge of the module base 210 greater than the nominal length of a human hand and cooperate with the target gap maintained by the rear latch 229 and the rear latch receiver 239 in cooperation with the upper latch 229 and the upper latch receiver 239, to reduce the likelihood of inadvertent contact with the electrical connection.

2.3.4 Temporary Use, Storage, and Portability

In one example, the user can assemble module bases and solar panels into power generation units on the user's roof and connects the power output to their home to provide supplemental power generation. When the user requires power in another location—such as the garden—the user travels to the roof, disconnects the power generation units from the house, disassembles the power generation units and module bases, transports the components to the garden, reassembles the module bases and solar panels into power generation units, and connects the power output to the required device.

In another example, the module base 210 can be disassembled and temporarily stored in response to an event, such as a snowstorm forecasted to deposit an amount of snow that would bury the first and second module bases that are assembled and in operation in an outdoor environment. The user can disassemble the first and second module base 210 and store them in a place protected from snowfall until the snowfall is complete. After the snow has fallen; the user can reassemble the module bases and solar panels into power generation units and reconnect the power outputs to produce and use power.

2.4 Additional Modules

Generally, a user can procure additional module bases and solar panels to create an array or multiple arrays of power generation units. Due to the low relative power generation of a single solar panel 290 in comparison to other forms of power generation, an array of several power generation units would be advantageous to a user.

For example, a user procures additional module bases to create an array of power generation units and assembles the module bases on the level surface of her roof. The user assembles a set of module bases adjacent to one another and fills the front ballast 260 and rear ballast 270 of each module base 210 with a volume of liquid. The user arranges the set of module bases such that a left component 220 of a first module base 210 is parallel and adjacent to a right component 230 of a second module base 210, and a left component 220 of the second module base 210 is parallel and adjacent to a right component 230 of a third module base 210, and so on for the remaining module bases in the set of module bases. The user connects the first module base 210 to the second module base 210 by engaging the front latch 229 of the first module base 210 with the front latch retention structure 239 of the second module base 210 and engaging the rear latch 229 of the first module base 210 with the rear latch 229 retention structure of the module base. The user continues until all module bases in the set of module bases are connected via the front latch 229 and front latch retention structure 239 and the rear latch 229 and rear latch retention structure 239. The user places a solar panel 290 on each module base 210 to create a set of power generation units. The user runs the power output connection of the module base 210 through the electrical port of the module base 210 and through the electrical port of the adjacent module base 210 and connects the power output connection to her home's electrical system.

In another variation shown in FIG. 7, the user arranges a set of module bases in an array configuration on an undulating portion of non-planar terrain including both concave and convex sections. As shown in FIGS. 8A, 8B, 8C, 8D, 8E, 8F, 8G, and 8H, the module base 210 further includes upper latches and corresponding upper latch receivers, which cooperate with the front latches and front latch receivers and rear latches and rear latch receivers to permit flexibility in the orientation of adjacent module bases relative to each other and allow the assembly of an array—including multiple module bases—on a section of terrain that is not level or planar. Imperfectly level terrain may be encountered when arranging a number of module bases to produce a power level sufficient for a user's needs proximal the location in which the power is required, particularly in an outdoor or natural environment, or a remote outdoor location situated away from or devoid of established infrastructure such as pavement, leveled terrain, and power connections.

For example, the user arranges the set of module bases in a line, with the right component 230 of a first module base 210 parallel and adjacent to the left component 220 of a second module base 210, with the right component 230 of the second module base 210 parallel and adjacent to the left component 220 of a third module base 210, and so on, along an undulating surface, with a concave section and a convex section. The user connects a first module base 210, positioned in the concave section, to a second module base 210 positioned in the concave section, adjacent to the first module base 210, by engaging the upper latch 229 of the first module base 210 with the upper latch receiver 239 of the second module base 210, thereby maintaining a target gap between the upper rear corner of the first module base 210 and the upper rear corner of the second module base 210. The user connects the second module base 210, positioned in the concave section, to a third module base 210 positioned on the border of the concave section and the convex section, adjacent to the second module base 210 by engaging the upper latch 229 of the second module base 210 with the upper latch receiver 239 of the third module base 210, thereby maintaining a target gap between the upper rear corner of the second module base 210 and the upper rear corner of the third module base 210. The user connects the third module base 210 positioned on the border of the concave section and the convex section to a fourth module base 210, positioned in the convex section, adjacent to the third module base 210 by engaging the front lower latch of the third module base 210 with the front lower latch receiver of the fourth module base 210, and by engaging the rear lower latch of the third module base 210 with the rear lower latch receiver of the fourth module base 210, thereby maintaining a target gap between the lower edge of the third module base 210 and the lower edge of the fourth module base 210. The user connects the fourth module base 210, positioned in the convex section to a fifth module base 210 positioned in the convex section adjacent to the fourth module base 210, by engaging the front lower latch of the fourth module base 210 with the front lower latch receiver of the fifth module base 210, and by engaging the rear lower latch of the fourth module base 210 with the rear lower latch receiver of the fifth module base 210, thereby maintaining a target gap between the lower edge of the fourth module base 210 and the lower edge of the fifth module base 210. The power output connection from each solar panel 290 in the array is routed through the electrical ports of the module bases and through the right electrical port or the left electrical port of one of the two module bases positioned on the end of the array configuration, similar to the previous example. The power output connection is then connected to a device requiring power. The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of an owner computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:
1. A system comprising a first module base comprising:
  a first left component defining:
    a first left triangular structure comprising:
      a first left front edge of a first front height; and
      a first left rear edge of a first rear height greater than the first front height; and
    a first set of left intra-assembly features;
  a first right component defining:
    a first right triangular structure comprising:
      a first right front edge of the first front height; and
      a first right rear edge of the first rear height; and
    a first set of right intra-assembly features;
  a first front fascia component:
    configured to couple to the first left component via the first set of left intra-assembly features;
    configured to couple to the right component via the first set of right intra-assembly features; and
    defining a first front ballast support surface;
  a first rear fascia component:
    configured to couple to the first left component via the first set of left intra-assembly features;
    configured to couple to the first right component via the first set of right intra-assembly features; and
    defining a first rear ballast support surface;
  a first front ballast:
    defining a first front enclosed volume configured to retain a first front volume of fluid; and
    configured to seat on the first front ballast support surface to load a first front section of the first module base;
  a first rear ballast:
    defining a first rear enclosed volume configured to retain a first rear volume of fluid; and
    configured to seat on the first rear ballast support surface to load a first rear section of the first module base;
  a first front left panel retention structure:
    coupled to a first left front section upper surface of the first module base; and
    configured to retain a first front edge of a first solar panel on the first module base;
  a first right front panel retention structure:
    coupled to a first right front section upper surface of the first module base; and configured to retain a first front edge of a first solar panel on the first module base;
a first closing panel:
   configured to install between the first left component and the first right component proximal a first rear section upper surface of the first module base; and
   configured to extend under a first rear edge of the first solar panel; and
a first left rear panel retention structure:
   coupled to a first left rear section upper surface of the first module base;
   mounted to a first left section of the first closing panel; and
   adjustable over a range of longitudinal positions to retain the first rear edge of the first solar panel on the first module base; and
a first right rear panel retention structure:
   coupled to a first right rear section upper surface of the first module base;
   mounted to a first right section of the first closing panel; and
   adjustable over a range of longitudinal positions to retain the first rear edge of the first solar panel on the first module base.

2. The system of claim 1:
wherein the first left component further defines:
   a first front latch on the first left front edge;
   a first rear latch on the first left rear edge; and
   a first left electrical port;
wherein the first right component further defines:
   a first front latch receiver on the first right front edge;
   a first rear latch receiver on the first right rear edge; and
   a first right electrical port;
further comprising:
   a second module base comprising:
      a second left component defining:
         a second left triangular structure comprising:
            a second left front edge of a second front height; and
            a second left rear edge of a second rear height greater than the second front height;
         a second set of left intra-assembly features comprising:
            a second front latch on the second left front edge;
            a second rear latch on the second left rear edge; and
            a second left electrical port;
      a second right component defining:
         a second right triangular structure comprising:
            a second right front edge of the second front height; and
            a second right rear edge of the second rear height;
         a second front latch receiver on the second right front edge and configured to engage the first front latch of the first left component to retain the first front section of the first module base to a second front section of the second module base;
         a second rear latch receiver on the second right rear edge and configured to engage the first rear latch of the first left component to retain the first rear section of the first module base to the second rear section of the second module base;
         a second right electrical port aligned with and configured to pass an electrical connection to the first left electrical port; and
         a second set of right intra-assembly features; and
         configured to abut the first left component of the first module base;
   a second front fascia component:
      configured to couple to the second left component via the second set of left intra-assembly features;
      configured to couple to the right component via the second set of right intra-assembly features; and
      defining a second front ballast support surface;
   a second rear fascia component:
      configured to couple to the second left component via the second set of left intra-assembly features;
      configured to couple to the second right component via the second set of right intra-assembly features; and
      defining a second rear ballast support surface;
   a second front ballast:
      defining a second front enclosed volume configured to retain a second front volume of fluid; and
      configured to seat on the second front ballast support surface to load a second front section of the second module base;
   a second rear ballast:
      defining a second rear enclosed volume configured to retain a second rear volume of fluid; and
      configured to seat on the second rear ballast support surface to load a second rear section of the second module base;
   a second front left panel retention structure:
      coupled to a second left front section upper surface of the second module base; and
      configured to retain a second front edge of a second solar panel on the second module base;
   a second right front panel retention structure:
      coupled to a second right front section upper surface of the second module base; and
      configured to retain a second front edge of a second solar panel on the second module base;
   a second left rear panel retention structure:
      coupled to a second left rear section upper surface of the second module base; and
      adjustable over a range of longitudinal positions to retain a second rear edge of the second solar panel on the second module base; and
   a second right rear panel retention structure:
      coupled to a second right rear section upper surface of the second module base; and
      adjustable over a range of longitudinal positions to retain the second rear edge of the second solar panel on the second module base.

3. The system of claim 2:
wherein the first module base is configured to transiently locate on a nonplanar terrain surface;
wherein the second module base is configured to transiently locate on the nonplanar terrain surface adjacent the first module base; and
wherein the first front latch and the first rear latch define a first latch length configured to;
   maintain a target gap between a first left lower edge of the first left component and a second right lower edge of the second right component; and
   enable a variable gap between a first upper rear corner of the left component and a second upper rear corner of the second right component to accommodate variance in the nonplanar terrain surface.

4. The system of claim 3, wherein:
the first left component further defines a first upper latch located at an upper rear left corner;
the second right component further defines a second upper latch receiver at an upper right rear corner;
the first rear latch and the second rear latch receiver cooperate to retain the first left lower edge of the first left component and the second right lower edge of the second right component when positioned on a convex section of the nonplanar terrain surface; and
the first upper latch and the second upper latch receiver cooperate to retain the first upper rear corner of the first left component and the second upper rear corner of the second right component when positioned on a concave section of the nonplanar terrain surface.

5. The system of claim 1:
wherein the first left component further comprises:
   a first left front lower protrusion:
      located proximal the first left front edge; and
      extending normal from a first left lower edge;
   a first left rear lower protrusion:
      located proximal the first rear left edge the first left rear edge; and
      extending normal from the first left lower edge;
   a first left front upper protrusion:
      located proximal the first left front edge; and
      extending normal from a first left upper edge;
   a first left rear upper protrusion:
      located proximal the first left rear edge; and
      extending normal from the first left upper edge;
   a first left midpoint upper protrusion:
      located proximal a midpoint of the first left upper edge; and
      extending normal from the first left upper edge; and
wherein the first right component further comprises:
   a first right front lower protrusion:
      located proximal the first right front edge; and
      extending normal from a first right lower edge;
   a first right rear lower protrusion:
      located proximal the first right rear edge; and
      extending normal from the first right lower edge;
   a first right front upper protrusion:
      located proximal the first right front edge; and
      extending normal from a first right upper edge;
   a first right rear upper protrusion:
      located proximal the first right rear edge; and
      extending normal from the first right upper edge; and
   a first right midpoint upper protrusion:
      located proximal a midpoint of the first right upper edge; and
      extending normal from the first right upper edge.

6. The system of claim 5, further comprising:
a first left lower relief section between the first left front lower protrusion and the first left rear lower protrusion to accommodate passive ventilation between an interior of the first module base and an exterior of the first module base;
a first right lower relief section between the first right front lower protrusion and the first right rear lower protrusion to accommodate passive ventilation between the interior of the first module base and the exterior of the first module base;
a first left lower relief section between the first left front upper protrusion and the first left midpoint upper protrusion to accommodate passive ventilation between the interior of the first module base and the exterior of the first module base;
a first left rear upper relief section between the first left midpoint upper protrusion and the first left rear upper protrusion to accommodate passive ventilation between the interior of the first module base and the exterior of the first module base;
a first right lower relief section between the first right front upper protrusion and the first right midpoint upper protrusion to accommodate passive ventilation between the interior of the first module base and the exterior of the first module base; and
a first right rear upper relief section between the first right midpoint upper protrusion and the first right rear upper protrusion to accommodate passive ventilation between the interior of the first module base and the exterior of the first module base.

7. The system of claim 1:
wherein the first front left panel retention structure further defines:
   a retention base;
   a retention fastener; and
   a clamping feature;
wherein the first right front panel retention structure further defines:
   a retention base;
   a retention fastener; and
   a clamping feature; and
further comprising:
   a first left spring element fixed to the first left component proximal a first upper front left edge of the first left component; and
   a first right spring element:
      fixed to the first right component proximal a first upper right front edge of the first right component; and
      configured to cooperate with the first left spring element to center the first solar panel on the first module base and to guide the first front edge of the first solar panel into the first front left panel retention structure and into the first right front panel retention structure during installation of the first solar panel on the first module base.

8. The system of claim 1:
wherein the first left component further defines:
   a first rear ballast fill window proximal the first left rear edge of the first left component;
   a first rear ballast drain window proximal the first left rear edge of the first left component and below the first rear ballast fill window;
   a first front ballast fill window proximal the first left front edge of the first left component; and
   a first front ballast drain window proximal the first left front edge of the first left component and below the first front ballast fill window;
wherein the first rear ballast further defines:
   a first rear ballast fill neck configured to pass through the first rear ballast fill window; and
   a first rear ballast drain neck configured to pass through the first rear ballast drain window;
wherein the first front ballast further defines:
   a first front ballast fill neck configured to pass through the first front ballast fill window; and
   a first front ballast drain neck configured to pass through the first front ballast drain window; and
further comprising:
   a first rear ballast fill cap configured to install on the first rear ballast fill neck and accessible through the first rear ballast fill window to fill the first rear ballast with the first rear volume of fluid;
a first rear ballast drain cap configured to install on the first rear ballast drain neck and accessible through the first rear ballast drain window to drain the first rear volume of fluid from the first rear ballast;
a first front ballast fill cap configured to install on the first front ballast fill neck and accessible through the first front ballast fill window to fill the first front ballast with the first front volume of fluid; and
a first front ballast drain cap configured to install on the first front ballast drain neck and accessible through the first front ballast drain window to drain the first front volume of fluid from the first front ballast.

9. The system of claim 1:
wherein the first left rear panel retention structure defines:
a channel:
extending along a longitudinal axis, between and parallel to the left component and right component of the first module base; and
configured to carry moisture away from a lower surface of the first solar panel;
a retention fastener;
a clamping feature mounted to the retention fastener; and
a retention insert constrained within the channel, configured to run longitudinally along the channel and configured to accept the retention fastener; and
wherein the first right rear panel retention structure defines:
a channel:
extending along a longitudinal axis, between and parallel to the left component and right component of the first module base; and
configured to carry moisture away from a lower surface of the first solar panel;
a retention fastener;
a clamping feature mounted to the retention fastener; and
a retention insert constrained within the channel, configured to run longitudinally along the channel and configured to accept the retention fastener.

10. The system of claim 1:
wherein the first module base defines an assembled width greater than the width of the first solar panel;
wherein the first left component defines a width:
to extend under a first left edge of the first solar panel; and
to extend outward beyond the first left edge of the first solar panel; and
wherein the first right component defines a width:
to extend under a first right edge of the first solar panel; and
to extend outward beyond the first left right of the first solar panel.

11. The system of claim 1:
wherein a first left front lower protrusion further defines an adjustable contact surface arranged between a lower surface of the first left front lower protrusion and a nonplanar terrain surface;
wherein a first right front lower protrusion further defines an adjustable contact surface arranged between a lower surface of the first right front lower protrusion and the nonplanar terrain surface;
wherein a first left rear lower protrusion further defines an adjustable contact surface arranged between a lower surface of the first left rear lower protrusion and the nonplanar terrain surface; and
wherein a first right rear lower protrusion further defines an adjustable contact surface arranged between a lower surface of the first right rear lower protrusion and the nonplanar terrain surface.

12. The system of claim 1, wherein a rear panel retention surface extends beyond the first rear section upper surface to retain a first solar panel with a longitudinal dimension greater than the longitudinal dimension of an upper surface of the first module base.

13. The system of claim 1, wherein the first left component, the first right component, the first front fascia component, the first rear fascia component, and the first closing panel are formed as a set of hollow molded polymer parts.

14. The system of claim 1:
further comprising a storage case;
wherein the first left component and the first right component are configured to nest in the storage case with a first left top edge of the first left component facing a right top edge of the first right component for shipping; and
wherein the first front ballast, the first rear ballast, the first front fascia component, and the first rear fascia component are configured to nest below the first left component and the first right component in the storage case for shipping.

15. A system comprising a module base comprising:
a left component defining:
a left triangular structure comprising:
a left front edge of a front height; and
a left rear edge of a rear height greater than the front height; and
a set of left intra-assembly features;
a right component defining:
a right triangular structure comprising:
a right front edge of the front height; and
a right rear edge of the rear height; and
a set of right intra-assembly features;
a front fascia component:
configured to couple to the left component via the set of left intra-assembly features;
configured to couple to the right component via the set of right intra-assembly features; and
defining a front ballast support surface;
a rear fascia component:
configured to couple to the left component via the set of left intra-assembly features;
configured to couple to the right component via the set of right intra-assembly features; and
defining a rear ballast support surface;
a front ballast:
defining a front enclosed volume configured to retain a front volume of fluid; and
configured to seat on the front ballast support surface to load a front section of the module base;
a rear ballast:
defining a rear enclosed volume configured to retain a rear volume of fluid; and
configured to seat on the rear ballast support surface to load a rear section of the module base;
a front left panel retention structure:
defining:
a left retention base;
a left retention fastener; and
a left clamping feature;

coupled to a left front section upper surface of the module base; and
configured to retain a front edge of a solar panel on the module base;
a right front panel retention structure:
  defining:
    a right retention base;
    a right retention fastener; and
    a right clamping feature;
  coupled to a right front section upper surface of the module base; and
  configured to retain a front edge of a solar panel on the module base;
a left rear panel retention structure:
  coupled to a left rear section upper surface of the module base; and
  adjustable over a range of longitudinal positions to retain a rear edge of the solar panel on the module base; and
a right rear panel retention structure:
  coupled to a right rear section upper surface of the module base; and
  adjustable over a range of longitudinal positions to retain the rear edge of the solar panel on the module base;
a left spring element fixed to the left component proximal an upper front left edge of the left component; and
a right spring element:
  fixed to the right component proximal an upper right front edge of the right component; and
  configured to cooperate with the left spring element:
    to center the solar panel on the module base; and
    to guide the front edge of the solar panel into the front left panel retention structure and into the right front panel retention structure during installation of the solar panel on the module base.

\* \* \* \* \*